United States Patent [19]

Figart et al.

[11] 4,165,443
[45] Aug. 21, 1979

[54] POWER DISTRIBUTION SYSTEM

[76] Inventors: Earl C. Figart, 815 Fir Dr.; J. Kevin Kelly, 1036 Greenfield Cir.; Richard A. Di Marcello, 1312 Penfield Rd., all of State College, Pa. 16801

[21] Appl. No.: 598,644

[22] Filed: Jul. 24, 1975

[51] Int. Cl.² .............................................. H02G 3/18
[52] U.S. Cl. ....................................... 174/53; 174/57; 307/147; 339/95 D; 339/150 T
[58] Field of Search ................. 174/53, 57, 59; 220/3, 220/7; 339/122 R, 150 T, 198 R, 159 R, 95 D, 164 R; 307/147

[56] References Cited

U.S. PATENT DOCUMENTS

| | | | |
|---|---|---|---|
| 2,397,688 | 4/1946 | Osinski | 174/53 |
| 2,410,287 | 10/1946 | Jaberg | 174/53 |
| 2,581,024 | 1/1952 | Joyce | 174/53 |
| 2,920,303 | 1/1960 | Johnson | 174/53 X |
| 3,038,141 | 6/1962 | Chiuchiolo | 174/53 X |
| 3,157,732 | 11/1964 | Richards | 174/59 X |
| 3,555,492 | 1/1971 | Smith | 339/95 D |
| 3,569,911 | 3/1971 | Bogdanowicz | 339/95 D |
| 3,716,651 | 2/1973 | Werner | 174/53 |
| 3,717,840 | 2/1973 | Vaughan | 339/95 D |
| 3,814,834 | 6/1974 | Glader | 174/57 |
| 3,879,101 | 4/1975 | McKissic | 339/122 R |
| 3,922,478 | 11/1975 | Perkey | 174/53 |

*Primary Examiner*—Bruce A. Reynolds
*Assistant Examiner*—David A. Tone
*Attorney, Agent, or Firm*—Mason, Fenwick & Lawrence

[57] ABSTRACT

Electrical distribution means is disclosed including mounting boxes for modular switch and receptacle units with a bus plate array in the boxes for receiving the stripped ends of cable conductors and spring contacts for engaging modular switch and receptacle units so that the conductors and units are automatically connected in the proper manner; another aspect of the invention involves the use of modular receptacle and switch unit mounting boxes having upper and lower slots of different widths for snugly receiving the upper and lower ends of the modular units of mating widths to permit insertion of the modular units only in a proper manner; other mounting boxes accept three-way or four-way switches and include appropriate bus plate arrays for providing three and four-way fixture controlled distribution systems which are automatically effected by plugging in cables keyed to the mounting boxes by color coded designators.

45 Claims, 26 Drawing Figures

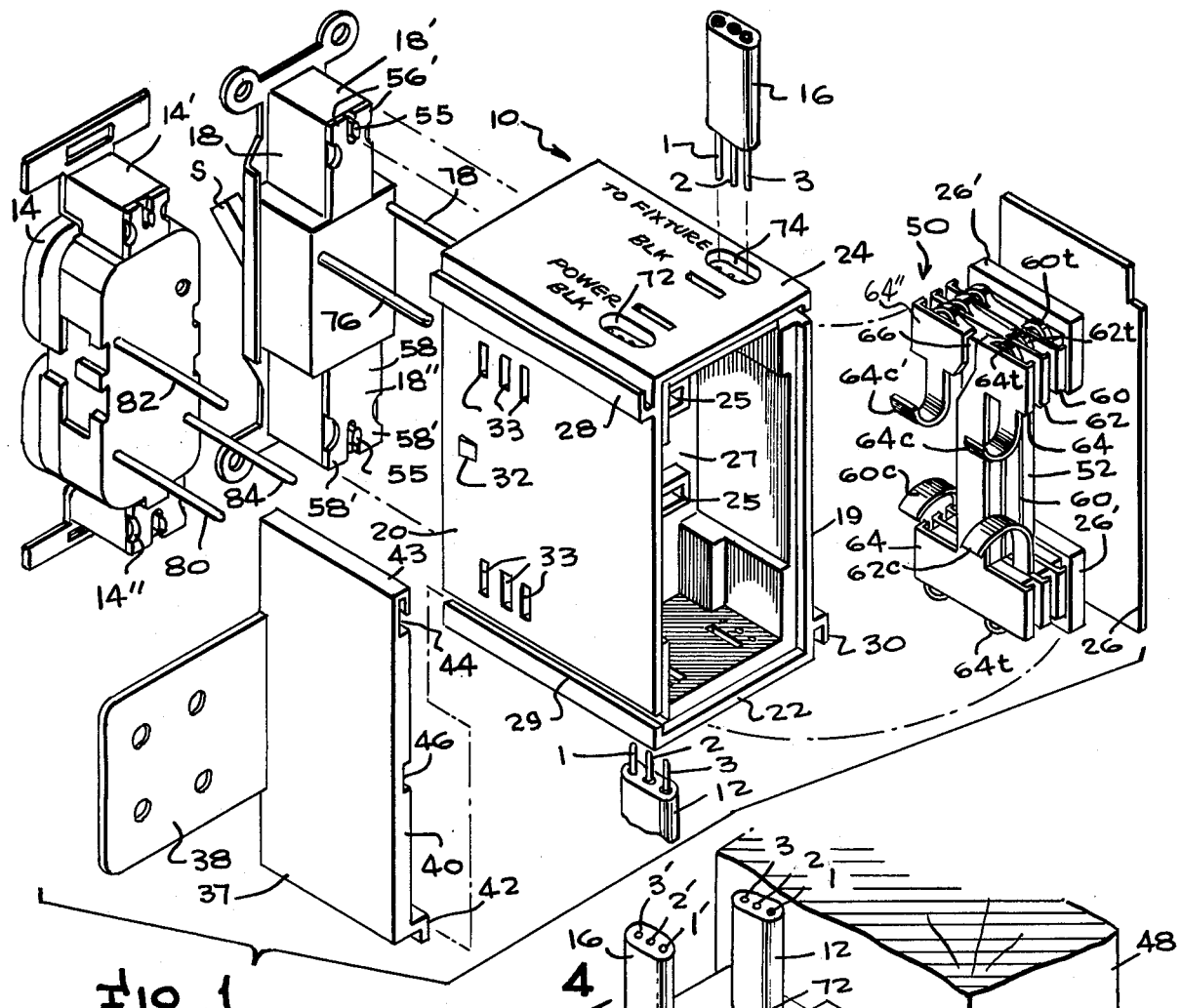
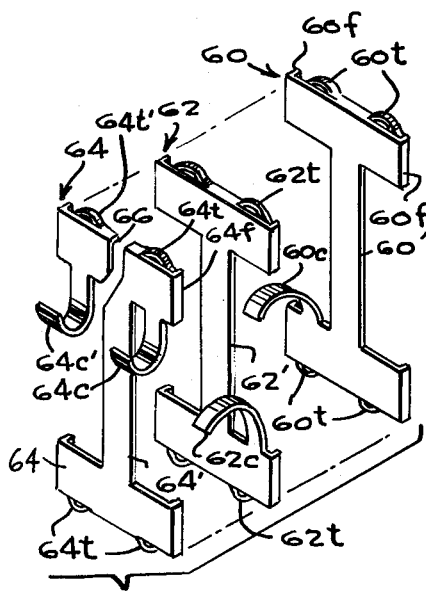
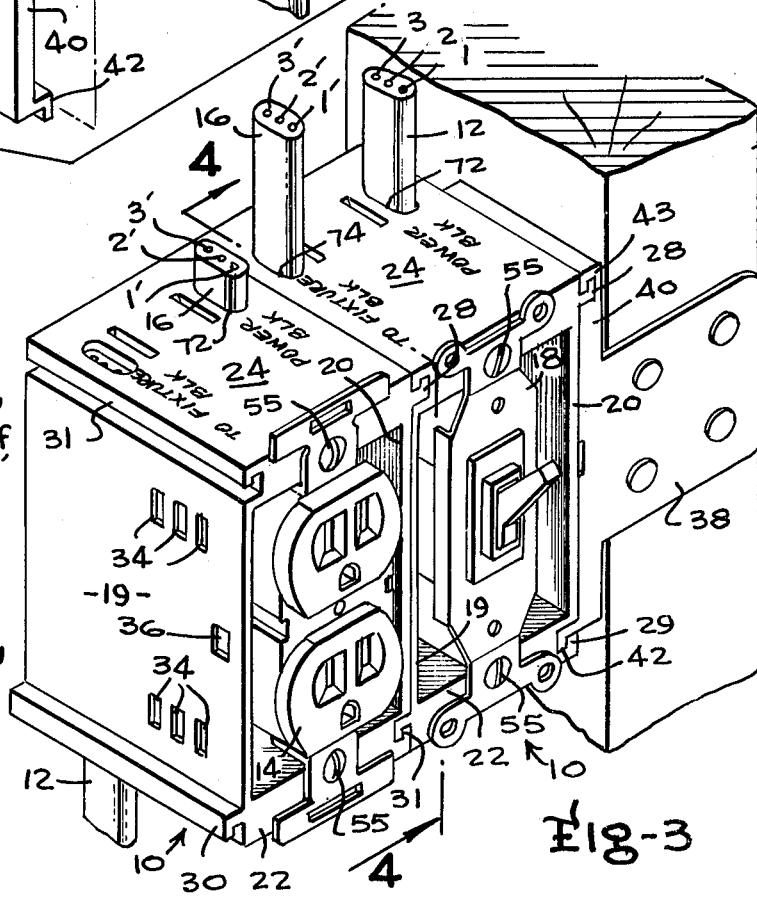

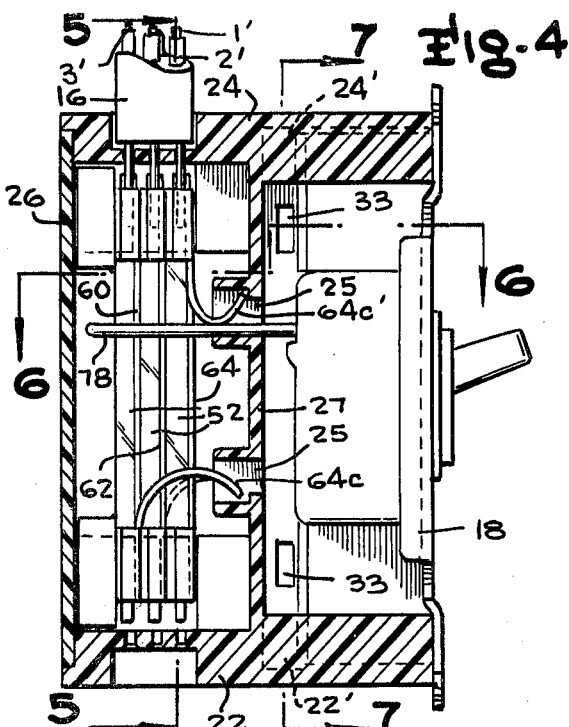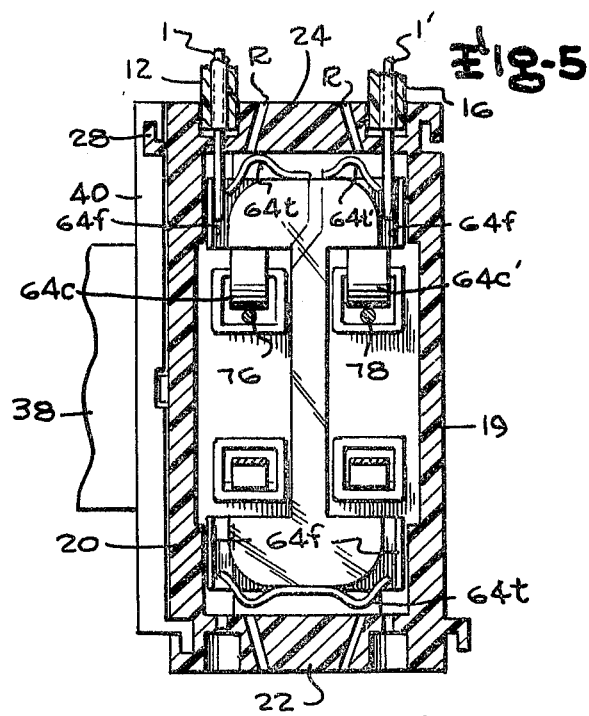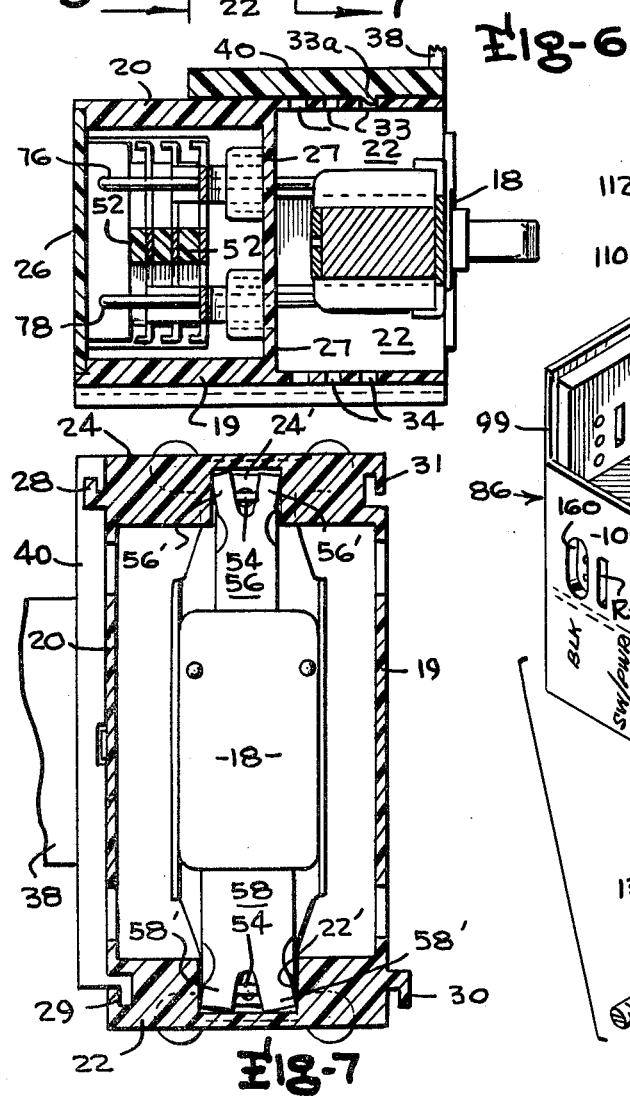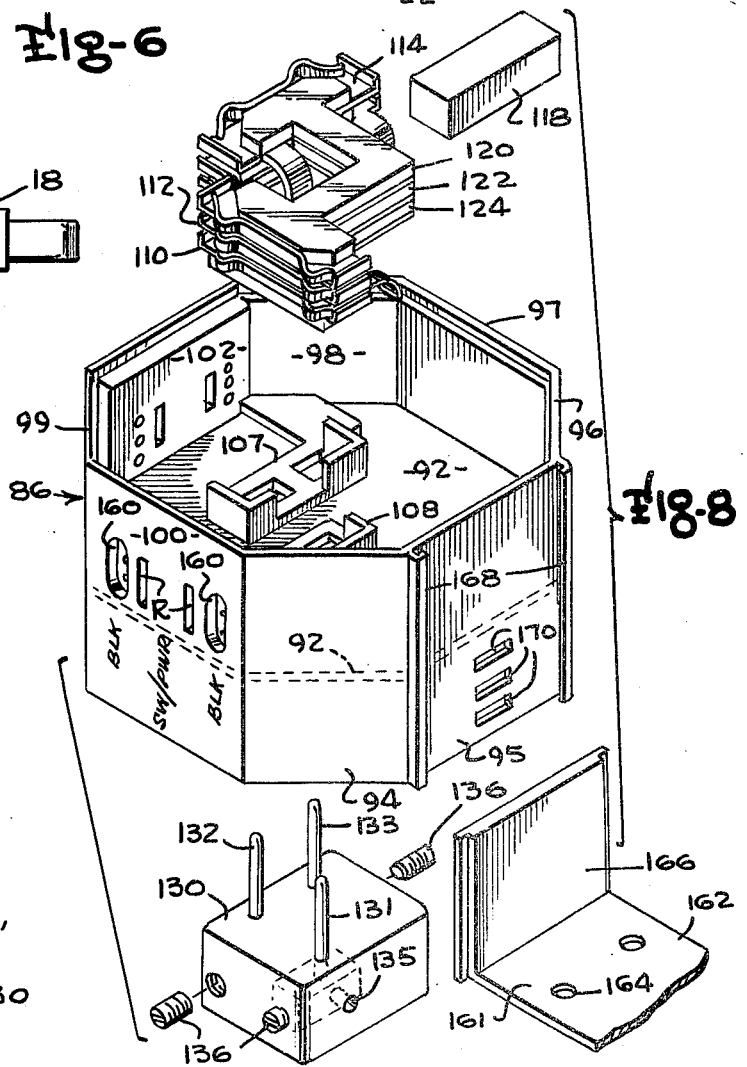

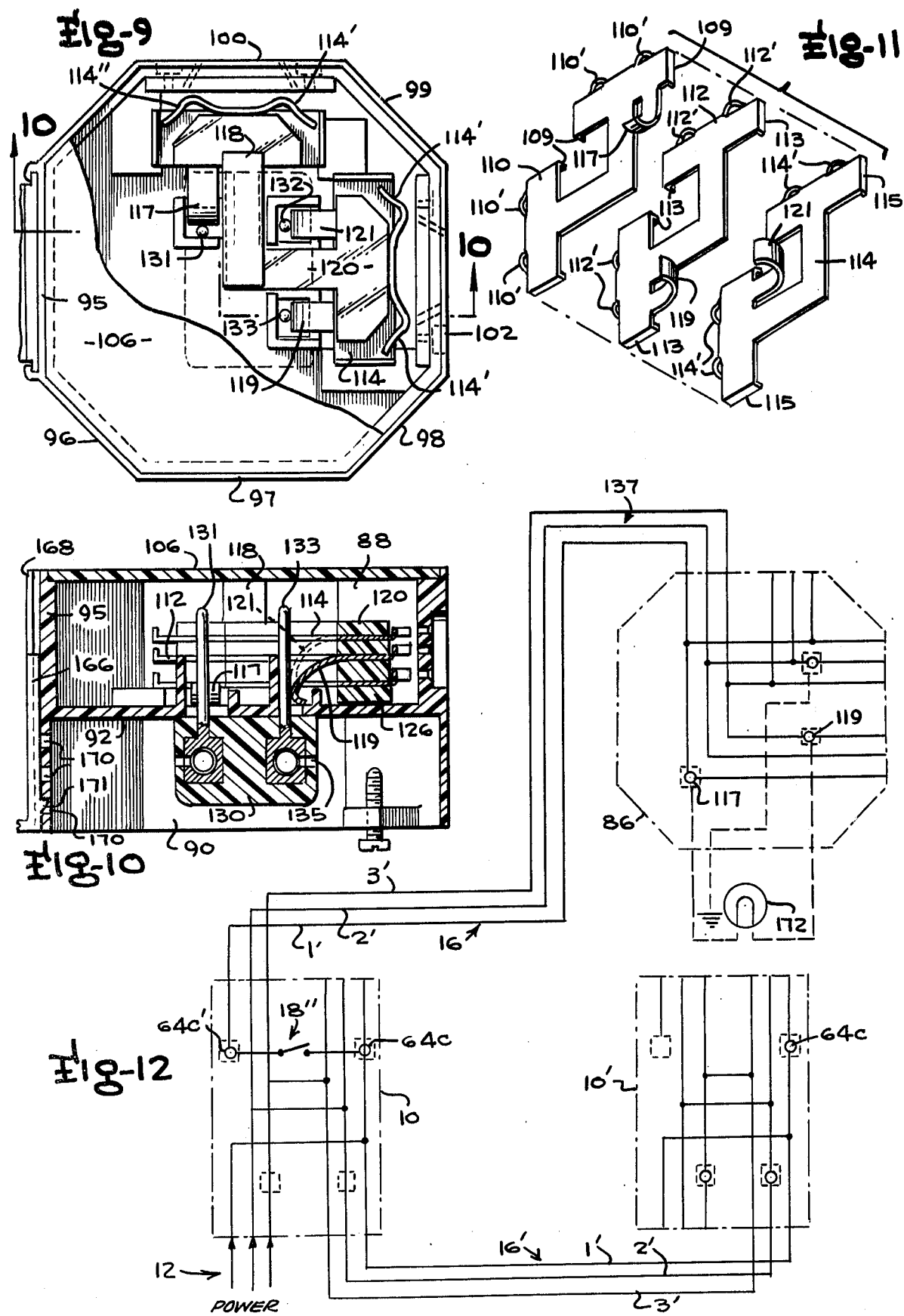

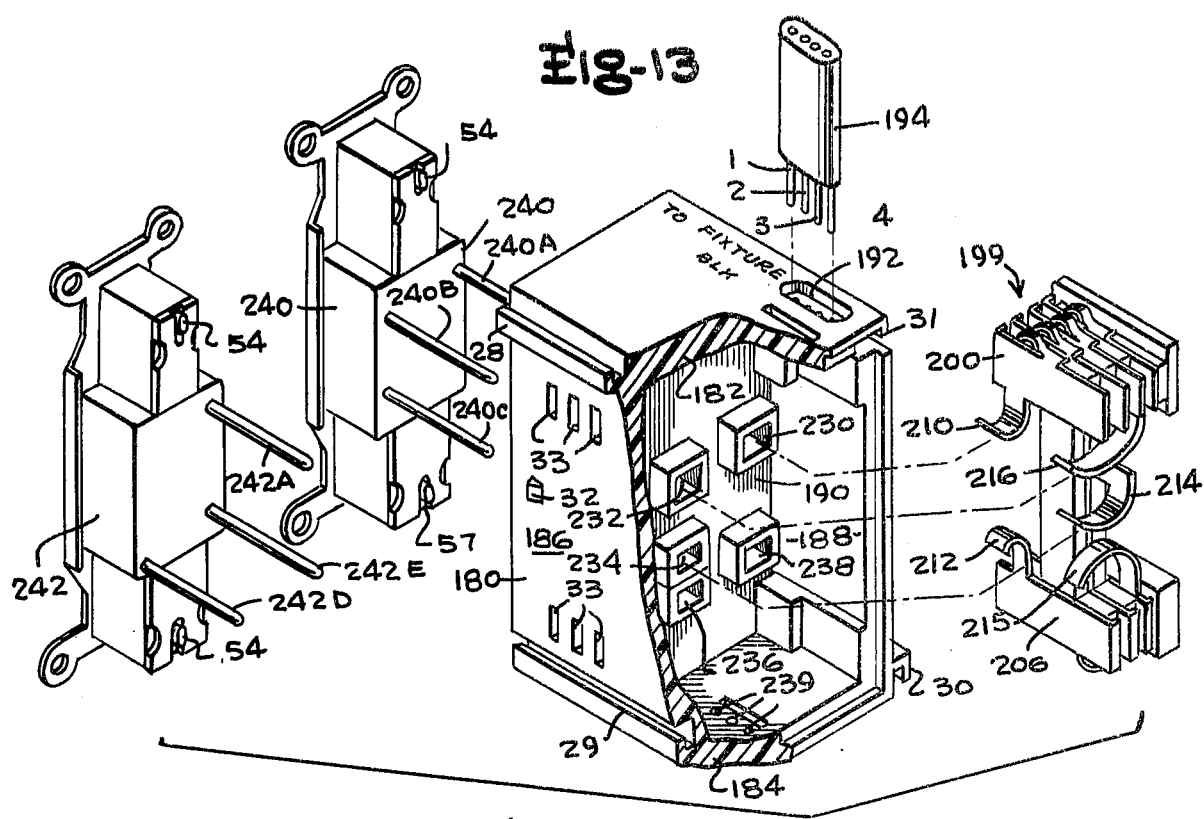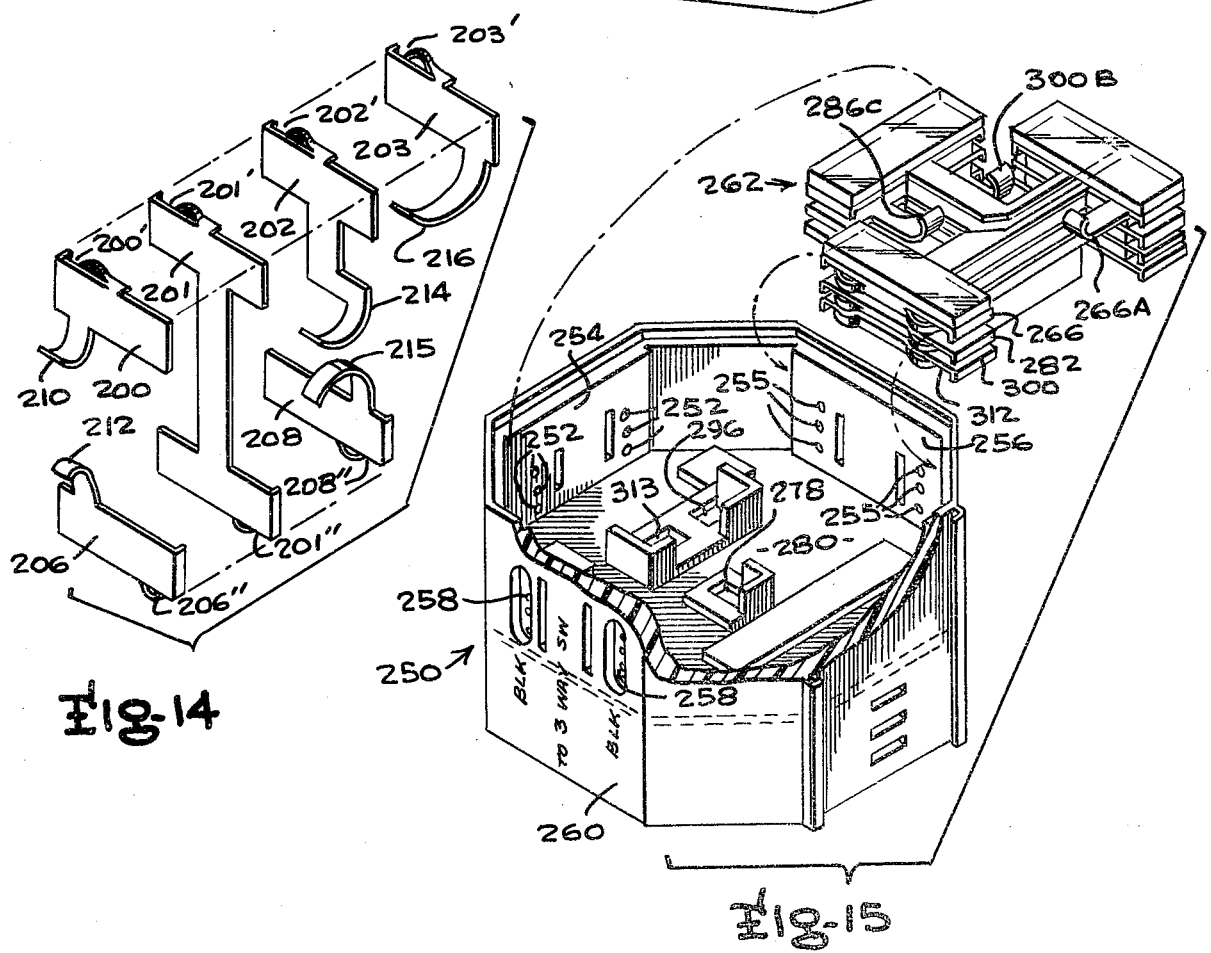

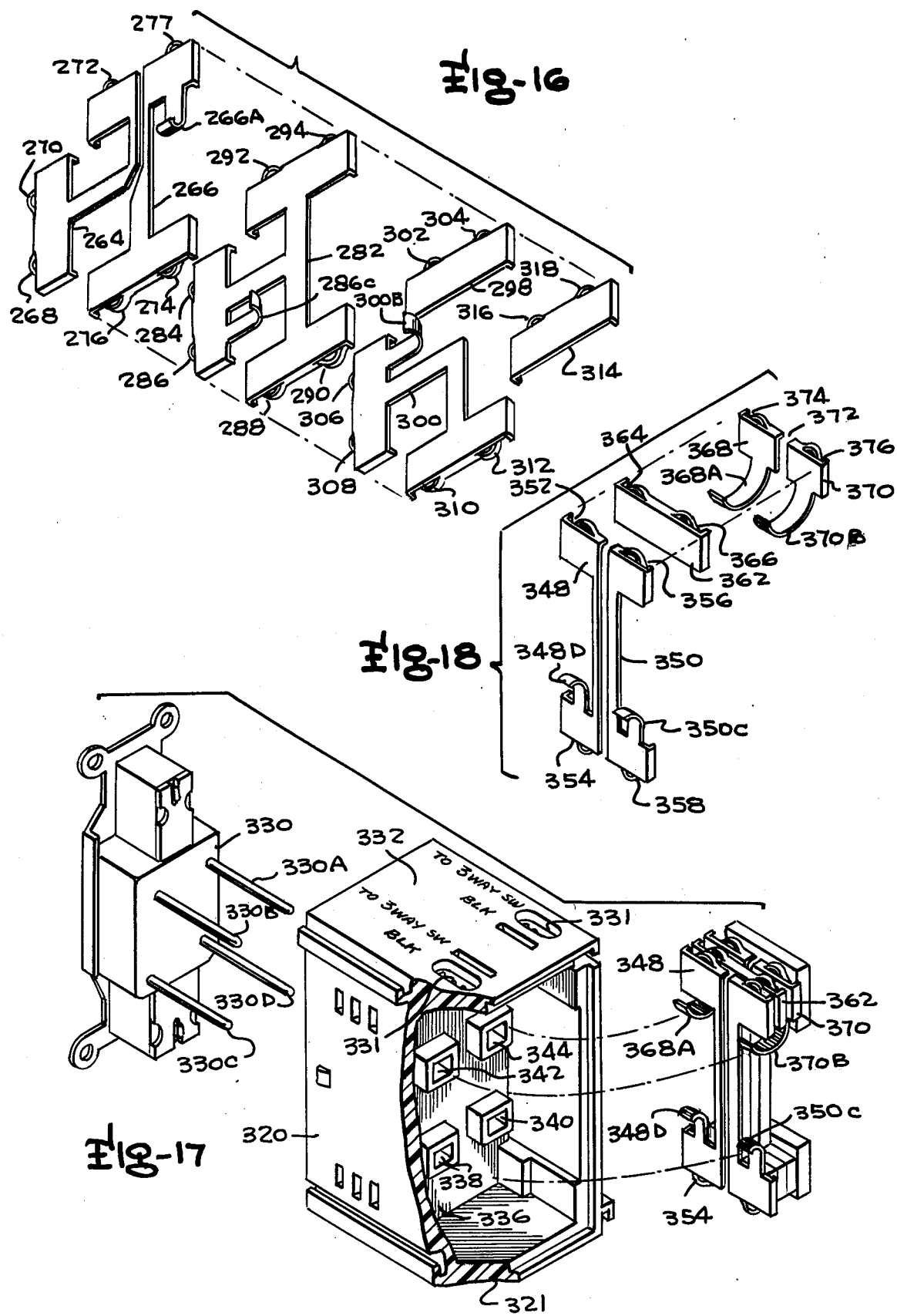

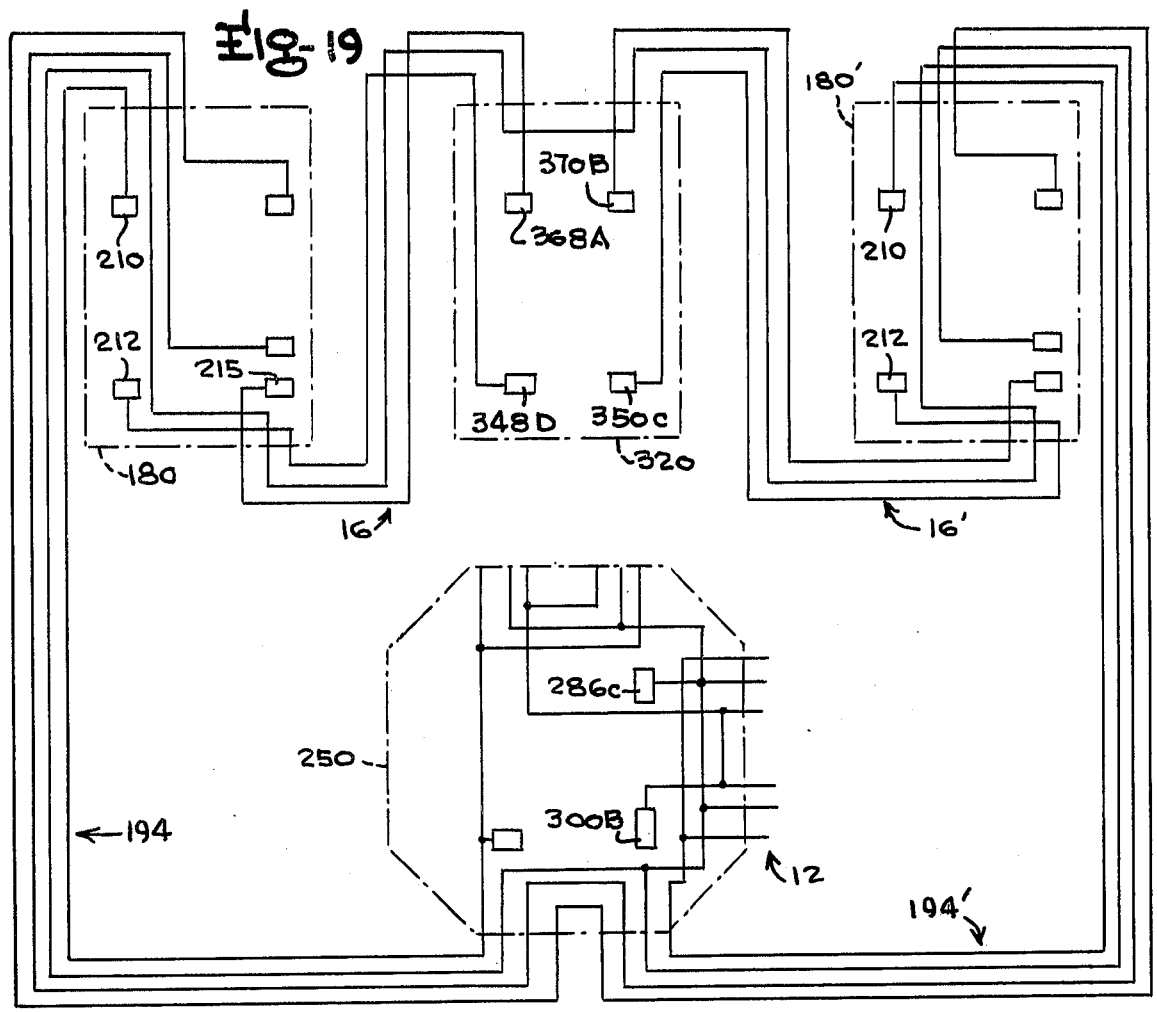
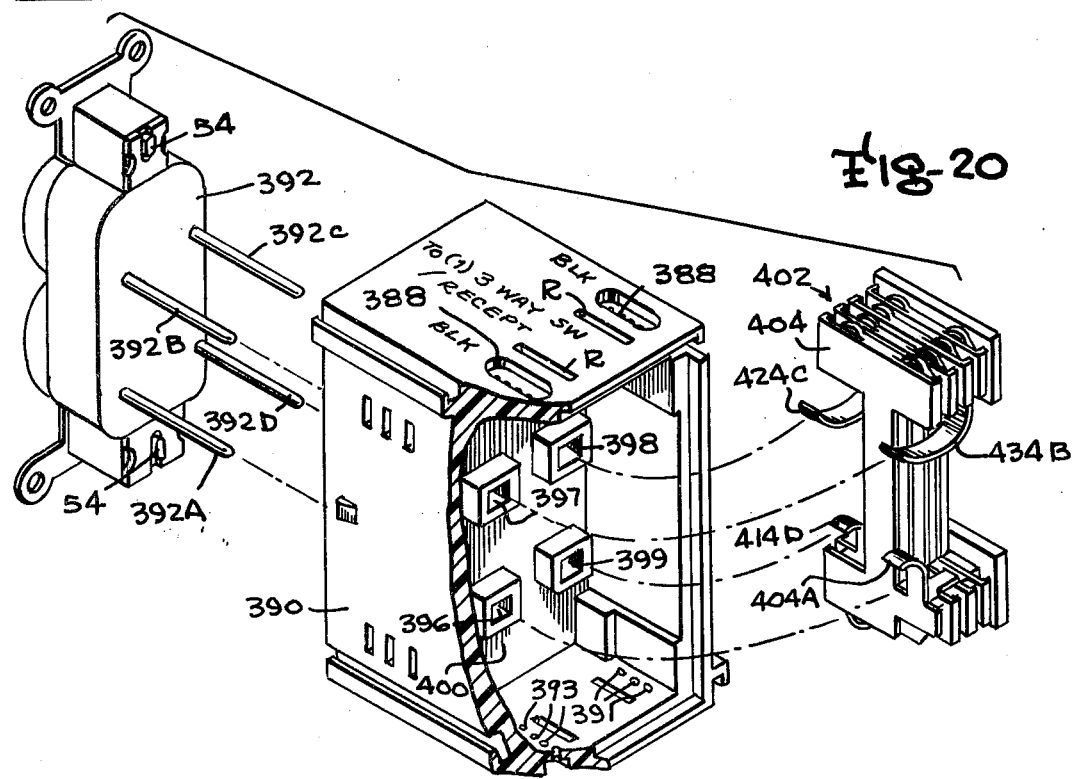

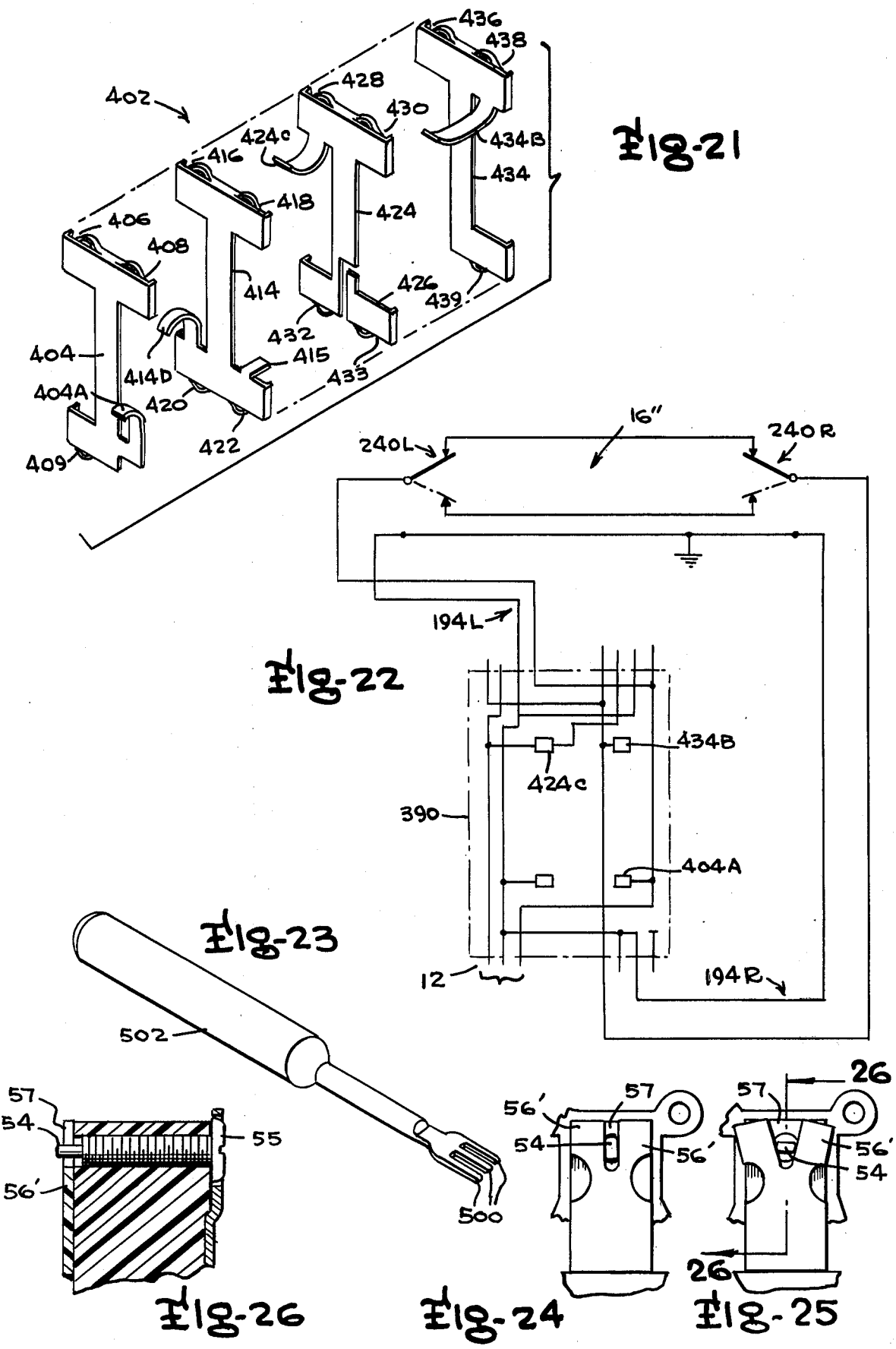

POWER DISTRIBUTION SYSTEM

The present invention is in the field of electrical distribution systems and is particularly directed to the field of distribution systems for effecting the distribution of electrical power in buildings such as homes, factories, or other industrial structures.

Presently employed electrical equipment such as receptacles, switches, light fixtures and the like is installed by a hand-wiring operation requiring the expensive services of electricians with the present procedures differing only slightly from procedures in use for fifty or more years. These presently employed procedures are extremely time-consuming and since the hourly wage of electricians is among the highest of all craftsmen, the cost of installing the electrical distribution system in a building represents a substantial portion of the total building cost.

Another problem with the presently employed hand-wiring technique is due to the fact that even the most skilled electricians occasionally make errors in wiring which can result in short circuits, inoperative or "dead" circuits are overloaded circuits. The inconvenience and danger from such installation errors requires their immediate correction at substantial cost frequently including the cost of tearing out and subsequent rebuilding of walls to permit access to the electrical wiring. In addition, consequent delays in completion of the building result in further economic loss. Notwithstanding the longstanding nature of these problems, no adequate solution has been forthcoming up until the present invention.

While some specific function devices such as receptacles or switches that are easier to connect into the wiring system of a building having evolved as exemplified by the electrical receptacle of U.S. Pat. No. 3,828,113, such devices are usable only for a single purpose and do not provide a complete wiring system including multi-way switches and distribution means, the components of which are compatible for effecting provision of a fool-proof complete power distribution system in a building. The device of the aforementioned patent represents an improvement in receptacle design and is of obvious value for this sole purpose in that it enables a power cable to be plugged into the receptacle without any necessity for hand-wiring to a terminal strip or the like. However, the present invention represents an improvement over devices of this type in that a multi-function box is provided for plug-in connection to a power cable with the multi-function box including means permitting the use of modular receptacles, switches or the like all of which are automatically connected to the proper power cable and which, in the case of switches, permit the completion of electrical circuits to distribution cables extending from the multi-function box. It is impossible for the system of the present invention to be miswired and the installation time is much less than that for conventional systems with great savings consequently being achieved when the installation is made by electricians and even greater savings being achieved in many instances due to the fact that the system can be installed by less skilled and more inexpensive labor.

Another prior approach is that of Osinski U.S. Pat. No. 2,397,688 in which a box housing is provided for manual connection by terminal screws to power conduits with the housing including a pair of contacts engageable with the bayonet contacts of either a switch or a receptacle as the case may be. The disadvantage of the device of this patent is that the terminals must be connected to both power conductors when the device is to be used as a receptacle but must be wired differently with only one of the power conductors being connected to one of the terminals when the device is to be used as a switch since the other terminal will be connected to a supply line to the switch controlled item such as a lamp or the like.

Other prior attempts at simplification of electrical wiring systems are represented by U.S. Pat. Nos. 3,716,651; 3,510,822; 3,038,141; 2,410,287; 343,719; 2,920,303; 2,433,917; 2,501,569; 1,551,876; 1,938,309; 2,828,394; 2,531,350; 3,488,428; 1,835,554; 2,908,743 and 2,908,463.

Therefore, it is the primary object of this invention to provide a new and improved means for effecting the interconnection of the components of electrical distribution systems.

Yet another object of the invention is the provision of new and improved receptacles and switch mounting boxes.

A further object of the invention is the provision of new and improved electrical wiring systems in which the components are automatically interconnected in a proper manner by simply plugging in power and distribution cables and modular switch and receptacle units into component mounting boxes.

A still further object of this invention is the provision of a new and improved switch and receptacle mounting box and associated switch and receptacle modular units that can be easily adjusted inwardly and outwardly in an infinite manner for achieving an accurate flush mounting with the walls of the room in which the system is being installed.

Achievement of the foregoing and other objects of the invention is enabled through the provision of a series of mounting boxes each having a bus plate compartment at the rear in which a sandwich array of bus plates is provided with the bus plates having blade and flange contact portions into which the stripped ends of power and distribution cables are inserted and retained with selective ones of the bus plates also having spring contacts which are engaged by bayonet contacts on modular receptacle and switch units matingly inserted in the component mounting boxes. The surface of the component mounting boxes adjacent the openings in which the cables are inserted is provided with a visible designator indicating the required orientation of the cable for proper insertion in the box. Specifically, the designator is keyed to the color of the insulation on the cable components, which is different for each cable component, so that the cable is inserted in a required manner of orientation for engagement with the required bus plates in the component mounting box.

The component mounting boxes includes boxes capable of receiving simple single pole switch members or receptacles, other components capable of mounting three or four-way switch members and other distribution components for connection to fixtures or the like. When different types of components are used in a particular system, they are automatically connected in the proper manner by virtue of the specific design of the bus plates in the component mounting boxes and the specific design of the modular inserted units.

The mounting boxes for modular switch and receptacle units have upper and lower slots of different width in which the upper and lower ends of the modular units are snugly received and can be mounted only when properly oriented. Both the upper and lower ends of the modular units include expandable fingers which are urged outwardly to engage the slot walls perpendicularly to the direction of insertion by operation of a screw-head actuator on the face of the unit which is actuated to lock the unit in any desired position of insertion.

The manner in which the objects of the invention are achieved will be better understood when the following written description is considered in conjunction with the appended drawings in which like designators are used for the same elements and which comprises:

FIG. 1 is an exploded perspective view of a multi-function component mounting box and associated modular receptacle unit and switch unit means of the invention;

FIG. 2 is an exploded perspective view of a bus plate assembly provided in the multi-function box;

FIG. 3 is a perspective view of a pair of the multi-function boxes mounted together on a building frame component for respectively providing a switching and receptacle function;

FIG. 4 is a sectional view taken along lines 4—4 of FIG. 3;

FIG. 5 is a sectional view taken along lines 5—5 of FIG. 4;

FIG. 6 is a sectional view taken along lines 6—6 of FIG. 4;

FIG. 7 is a sectional view taken along lines 7—7 of FIG. 4;

FIG. 8 is an exploded perspective view of a multi-function octal box;

FIG. 9 is a top view with portions removed of the multi-function octal box of FIG. 8;

FIG. 10 is a sectional view taken along lines 10—10 of FIG. 9;

FIG. 11 is an exploded perspective of a bus plate assembly employed in the octal box of FIG. 9;

FIG. 12 is a circuit diagram illustrating a power circuit employing the multi-function octal box of FIG. 9 and the multi-function boxes mounting switches and receptacles in the manner of FIG. 3;

FIG. 13 is an exploded perspective view illustrating a multi-function component mounting box for use with three-way switch means;

FIG. 14 is an exploded perspective view of a bus plate assembly employed in the multi-function box of FIG. 13;

FIG. 15 is an exploded perspective of a multi-function octal component mounting box for use with the system of FIG. 13;

FIG. 16 is an exploded perspective of a bus plate assembly employed in the octal box of FIG. 14;

FIG. 17 is an exploded perspective view of a multi-function component mounting box for use with a four-way switch;

FIG. 18 is an exploded perspective view of a bus plate assembly employed in the device of FIG. 17;

FIG. 19 is a circuit diagram illustrating employment of the components of FIGS. 13, 15 and 17 in a typical power distribution circuit;

FIG. 20 is an exploded perspective of a multi-function component mounting box for a receptacle which is usable with a three-way or a single pole switch;

FIG. 21 is an exploded perspective of a bus plate assembly employed in the device of FIG. 20;

FIG. 22 is a circuit diagram illustrating employment of the device of FIG. 20 in a typical power distribution circuit;

FIG. 23 illustrates a tool employed for disconnecting power and distribution cables from the various component mounting boxes when required;

FIG. 24 is an elevational view of identical means employed on the modular switch and modular receptacle units for locking the units in a desired position in a mounting box illustrating the parts prior to actuation of the locking means;

FIG. 25 is identical to FIG. 24 but illustrates the parts following actuation of the modular unit locking means; and FIG. 26 is a sectional view taken along lines 26—26 of FIG. 25.

Attention is initially invited to FIG. 1 of the drawings which illustrates basic components of the invention including a multi-function box 10 connectable to a three-wire power cable 12 for providing current to a modular electric receptacle unit 14 mountable in the box 10 or for alternatively providing power to a power distribution cable 16 through a single pole modular electric switch unit 18 which can also be mounted in the box in the same manner as the modular receptacle unit 14.

Multi-function box 10 is formed of plastic or other similar non-conducting material and includes first and second parallel spaced side panels 19 and 20, a lower horizontal panel 22 and an upper horizontal panel 24. A vertically oriented center divider panel 27 is positioned approximately midway between the front and rear of the box and is oriented perpendicular to both the side panels 19 and 20 and the top and bottom panels 22 and 24. Lower panel 22 and upper panel 24 include modular unit mounting slots in their portions between divider panel 27 and the front of the box, which slots respectively comprise an upwardly facing rectangular slot 22' and a downwardly facing rectangular slot 24' of less width than slot 22' (FIG. 7). Additionally, the box 10 includes a rear cover panel 26 matingly received in a recess in the back of the box. Four reinforced openings 25 are provided in the divider panel 27 for a purpose to be discussed hereinafter.

It should be understood that the box 10 can be oriented in various positions and the terms "vertical," "horizontal," "top" and "bottom" are used with respect to the orientation of the parts shown in FIGS. 1 and 3; however, these terms are used to provide relative positioning for the various components with respect to each other regardless of the actual orientation of the devices.

The upper top corner edge portion of the side panel 20 is provided with an upwardly facing L-shaped mounting lip or flange 28 and the lower corner edge has a flange 29 defining an internal slot or groove of L-shaped configuration. Similarly, the lower edge of the other side panel 19 is provided with a downwardly facing mounting lip 30 identical to lip 28 and a flange 31 identical to flange 29. Side panel 20 is also provided with six locking and positioning indentations 33 with three of the locking and positioning indentations being adjacent the upper edge of the side panel and the other three being adjacent the lower edge of the side panel. The locking indentations 33 are in vertical alignment as shown in FIG. 1. Additionally, a wedge-shaped locking lug 32 extends outwardly from the outer face of the side panel 20. Similarly, the side panel 19 is provided with locking indentations 34 as shown in FIG. 3 and is also provided with a locking recess 36 dimensioned and positioned to receive the wedge-shaped locking lug 32 of an adjacent side panel 20 when two of the boxes are fastened together in side-by-side relationship as in FIG. 3.

Mounting of the box 10 on a supporting frame member 48 of a building in which the system is installed is easily effected by the employment of a mounting bracket 37 having an apertured attachment plate 38 and a box engaging side plate 40. A pair of identical locking lugs 33A are located on the internal surface of side plate 40 which mate with indentations 33 or 34 as shown in FIG. 6. These lugs 33A allow coarse positioning of the box referenced to framing member 48 in one of three (3) possible positions to compensate for various wall thickness. A clearance slot 46 extends from front to rear on the face of plate 40 to provide clearance for the locking lug when making this coarse adjustment. An L-shaped lug 42 identical in size and shape to flange 30 is provided on the lower end of plate 40 and is dimensioned to be slidably received in the slot behind flange 29 as shown in FIG. 3. L-shaped lug 43 on the upper edge of plate 40 defines an internal slot dimensioned to receive either mounting lip 28 or mounting lip 30.

FIG. 3 illustrates the mounting bracket 37 on a vertical framing member 48 of a building or the like with the portion 43 overlying the L-shaped mounting flange 28 and the L-shaped lug 42 received in the slot behind member 29. In mounting, the parts are placed in proper alignment and then moved rearwardly so that the lugs are positioned in the grooves in the manner as shown in FIG. 3.

The modular receptacle and switch units cannot be mounted in the box 10 unless they are properly oriented by virtue of the fact that the upper end 14' of the modular receptacle 14 and the upper end 18' of the modular switch units 18 are more narrow than the lower ends 14" and 18" of the respective units as shown in FIGS. 1 and 7. The upper ends 14' and 18' are dimensioned to slide into the upper slots 24' of the boxes 10 while the lower ends 14" and 18" are of greater width and cannot be received in the upper slots but can be received in the lower slots 22'. Consequently, the switch and receptacle units can only be mounted in the proper orientation illustrated in FIG. 7.

Upper and lower bifurcated lock plates 56 and 58 are provided on both the receptacle and switch modular units with the lock plates respectively having fingers 56' and 58' on their ends separated by a slot 57 in which an elongated rotary lug 54 is positioned. The opposite end of the rotary lug 54 is connected to a screw head 55 which can be rotated by a screw driver 90° for expanding the fingers 56' or 58' as the case may be against the sides of the slots 22' or 24' in which the fingers are located. Prior to mounting of the modular units, the lug 54 is oriented parallel to slot 57 as illustrated in FIG. 24. The modular unit is adjusted to a desired front-to-rear position so that the front of the modular unit will be flush with the wall of the room on which it is located and the lug 54 rotated to the position of FIG. 25 to expand fingers 56', 58' against the sides of slots 22' and 24' to lock the unit in place. The plates 56 and 58 are formed of elastic material so that subsequent rotation of the lug 54 to the FIG. 24 position permits the fingers 56' and 58' to return to their original position to enable removal or repositioning of the modular unit.

A bus plate ensemble 50 (FIG. 1) is mounted in the bus plate compartment of box 10 with the individual bus plates being separated by insulation material 52 (FIG. 6) to which the metal bus plates are bonded so that the bus plate assembly comprises a unitary sandwich type array of bus plates generally lying in individual parallel planes. The bus plate ensemble 50 consists of a rearmost bus plate 60 positioned adjacent a positioning block 26' on the rear panel 26, a central bus plate 62 and a forward pair of bus plates 64 and 64". The pair of plates 64, 64" and the other plates are of generally I-shaped configuration consisting of a central post portion 60', 62' and 64' of the bus plates 60, 62 and pair 64, 64" respectively with top and bottom cup plate portions extending perpendicularly from opposite ends of the central post portions as best shown in FIG. A. A spring contact 60c extends upwardly and forwardly from the lower cap plate of bus plate 60, a spring contact 62c extends upwardly and forwardly from the lower cap plate of the bus plate 62 and first and second spring contacts 64c and 64c' extend downwardly from plates 64 and 64''' which are electrically isolated from each other by a spacing 66 between the plate portions as best illustrated in FIG. 2.

The cap plates of the bus plate 60 include means for establishing contact with the conductors of three-wire cables comprising front to rear extending end flange portions 60f on each end of the cap plates and cantilever spring blade contact 60t associated with each flange portion and having a sharp outer edge facing its associated flange. The shape of the spring blade contact 64t is such that the stripped bare solid wire portions of the outer end of the power or distribution cable can be inserted in the space between the sharp outer edges of the blade contact and the facing sides of adjacent flange 64f as shown in FIG. 5. It will be seen that any outward movement of the conductor 1 will be resisted by the sharp outer edge of the blade contact. The spring blade contact is biassed into the conductor to maintain good electrical contact at all times.

The power cable 12 and the distribution cable 16 are of identical conventional configuration with each including power conductors 1 and 3 and a central grounding conductor 2. Following conventional procedure, the power conductor 1 will have black insulation, grounding conductor 2 will have green insulation and power conductor 3 will have white insulation for identification purposes.

The upper panel 24 is provided with a power cable access opening 72 and a distribution or fixture cable access opening 74 each of which consists of an outer well portion of oval configuration dimensioned to matingly receive the insulation on the end of a cable and three smaller openings extending through the remaining thickness of the panel beneath the well portion to the bus plate compartment. The smaller openings are dimensioned and positioned to permit the passage of the three stripped end wire portions of the cable through the panel 24 and are in alignment with the bus plate members so that the wire ends are forced downwardly between the outer sharp edge of the cantilever spring contacts 60t etc. and the end flanges 60f etc. to provide contact with the bus plate with which each wire is aligned.

The top and bottom panels of the box 10 are marked with a designation BLK indicative of the proper orientation of the cable for each opening in which a cable is inserted. In other words, the black conductor will be positioned closest to the aforementioned BLK indicia as shown in FIG. 3 so that all cable will be automatically connected in a required manner.

When the power cable 12 is connected to the box 10 adjacent the frame member 48 as in FIG. 3, the black conductor 1 is positioned internally of the bus plate compartment in contact with the blade contact 64t of the two-part bus plate 64, the middle or ground conductor 2 is connected to the blade contact 62t on the right side as viewed in FIG. 2 and the power conductor 3 is connected to the righthand blade contact 60t on the right side as viewed in FIGS. 1 and 2.

Modular single pole switch unit 18 has a pair of rearwardly extending external terminals 76 and 78 which are respectively positioned to extend through the upper two openings 25 in the center divider wall 27 into the bus plate compartment to engage the spring contacts 64c' and 64c of the bus plate 64 which are aligned with the upper two openings 25. It will be appreciated that the internal switch components of modular switch unit 18 provide a selected connection of the contacts 64c' and 64c or disconnection of these contacts in accordance with the position of the switch actuator S.

Conductor 1' of the distribution cable 16 of FIG. 3, which is identical to power cable 12, is positioned in contact with the upper lefthand portion of the bus plate 64 by means of the blade contact 64t', conductor 2' is connected to the middle bus plate 62 and is consequently in a common grounding circuit with the conductor 2 of the power cable 12 by means of their interconnection through the upper cap portion of the bus plate 62 in an obvious manner and conductor 3' of the distribution cable 16 is connected to the rear bus plate 60 by means of the blade contact 60t so that direct connection through the bus plates 60 for the power circuit is provided from the power conductor 3 of the power cable 12. Consequently, it will be seen that a circuit will be completed through the switch 18 to the distribution cable 16 and there is no way in which the system can be miswired.

Connection of a modular receptacle unit 14 is illustrated with respect to the left box 10 of FIG. 3 by means of a power input cable 12 connected to the lower panel 22. Power input cable 12 includes conductors 1 and 3 respectively connected to the lower knife edge contacts 64t of the forward bus plate 64 and 60t of the rearmost bus plate 60. The middle conductor 2 (the grounded conductor) is connected to the middle bus plate 62 by means of the lower contacts 62t on that side of the middle bus plate adjacent the cable 12. Modular receptacle unit 14 has three rearwardly extending elongated external terminals or contacts consisting of a grounding contact 80 and first and second power contacts 82 and 84. Grounding contact 80 engages the lower spring contact 62c of the grounded bus plate 62 and the first power contact 82 engages the upper righthand contact 64c of the forward bus plate as viewed in FIGS. 1 and 2 while the second power contact 84 engages the lower spring contact 60c of the rearmost bus plate 60. Consequently, the two power contacts 82 and 84 are electrically coupled to the power conductors 1 and 3 respectively of the power cable 12 to place the receptacle 14 in a "hot" condition ready for use.

Additionally, a further distribution cable 12 extends outwardly from the upper panel 24 and has its power conductors 1' and 3' respectively connected to the bus plates 64 and 60 by contacts 64t and 60t and has its ground conductor 2' connected to bus plate 62 by contacts 62t.

FIG. 8 illustrates an octal box 86 for use in a distribution system for a plurality of lights or the like. The octal box is internally divided into a bus plate compartment 88 and a fixture junction unit compartment 90 by a divider panel 92 which extends between the inner surfaces of the six walls of the octal box 86. The six walls defining the outer periphery of the octal box comprise planar wall members 94, 95, 96, 97, 98 and 99. Additionally, a first apertured wall 100 and a second apertured wall 102 are provided on opposite sides of the planar wall 99 and each include a pair of cable receiving access openings including a well portion and three conductor receiving apertures identical to the cable receiving wells 74 and apertures of the top and bottom panels 22 and 24 of the box 10 as previously discussed. Additionally, it should be noted that the top edges of the sides of the octal box are chamfered to provide support for a top cover plate 106 (FIG. 9).

Mounting and retaining platforms 107 and 108 extend outwardly from the upper surface of the divider panel 92 and receive and retain a bus plate ensemble consisting of a lower bus plate 110, an intermediate bus plate 112 and an upper bus plate 114 all of which are best illustrated in FIG. 11. Lower bus plate 110 includes four end flanges 109 each associated with a cantilever knife blade contact 110' in the same manner as the end flanges and cantilever blade contacts of the bus plates 60, 62 and 64. Bus plate 110 also includes a spring contact member 117.

Similarly, bus plate 112 includes spring blade contacts 112' and end flanges 113 and bus plate 114 includes spring blade contacts 114' and end flanges 115 associated to receive stripped cable wire ends in the same manner as the blade contacts and end flanges of the bus plates 60 etc.

A spacer block 118 engages the lower surface of the cover plate 106 and has its lower surface engaged with the upper surface of an insulation plate 120 to which it is bonded with the lower surface of the insulation plate 120 engaging the upper surface of the upper bus plate 114. Similarly, insulation panel 122 separates the upper bus plate 114 from the intermediate bus plate 112 and insulation panel 124 separates the intermediate bus plate 112 from the lower bus plate 110 with a lowermost insulation panel 126 being provided between the upper surface of the divider panel 92 and the lower surface of the lowermost bus plate 110 as shown in FIG. 10.

Octal box 86 is also provided with a plug type connector 130 consisting of an insulated block having upwardly extending elongated external terminals or contacts 131, 132 and 133, which are embedded in the insulated block forming the connector which includes a plurality of openings 135 in which the three wires 137 of a light fixture or the like can be inserted for retention by screw plugs 136. Elongated external terminals or contacts 131, 132 and 133 extend upwardly through openings in the divider panel 92 and the mounting and retaining platforms 108 and 109 so that the contact 132 engages the spring plate contact 121 of bus plate 114, contact 131 engages the spring contact 117 of bus plate 110 and contact 133 engages the spring contact 119 of the intermediate bus plate 112.

Any power distribution cable 16 having the ends of its conductors stripped and inserted through either of the openings in the walls 100 or 102 of the octal box 86 will have its power conductors 1' and 3' engaged with the spring blade contact members facing the openings through which the conductors are inserted so that bus plate 110 and bus plate 114 will be connected to the power conductors and the grounded conductor will be connected to bus plate 112. Consequently, the external terminal 133 which engages the bus plate 112 by means of spring contact 119 will be connected to ground while contacts 131 and 132 which respectively engage the bus plates 110 and 114 by spring contacts 117 and 121 will be connected to the power source from the conductors 1' and 3' of the distribution cable 16 so that voltage will be supplied to wires 137 of the fixture.

The octal box 86 is for use with a single pole modular unit switch means 18 mounted in a mounting box 10 in the manner previously discussed. In such use, the power input cable for the box constitutes a distribution cable 16 which is plugged into either one of the cable access openings 160 provided in walls 100 and 102 of the octal box. Cable access openings 160 are identical to the openings 72 and 74 provided in the multi-function box 10 as previously discussed. Obviously, the octal box 86 could also be employed with a direct input power cable not passing through a switch if so desired.

Support for the octal box 86 is provided by an L-shaped mounting bracket 161 (FIG. 8) consisting of a mounting plate 162 having apertures 164 permitting the use of screws or other fasteners for fastening the device to a frame member of the building and an octal box engaging and support plate 166 dimensioned to be slidably received along opposite edges in slots beneath plates 168 provided adjacent opposite edges of the planar wall 95 of the octal box. A series of locking indentations 170 are provided on the planar wall 95 for selected engagement with a lug 171 on the side of support plate 166 facing wall 95 as shown in FIG. 10 for permitting an adjustable positioning of the octal box in either one of the three locking indentations with the lug 171 being identical to the lug 32 of the box 10 as illustrated in FIG. 1.

FIG. 12 comprises a circuit diagram illustrating the employment of a component mounting box 10 for effecting the distribution of power to a second multi-function box 10' in which a modular receptacle unit is mounted and to an octal box 86 for providing connection to a fixture 172. A power input cable 12 has its conductors 1, 2 and 3 plugged into the power input opening in the lower horizontal panel 22 of box 10 and has its conductor 1 connected to the larger portion of bus plate 64 by the blade contact 64t on the lower end of the bus plate as illustrated in FIGS. 1 and 2. The other power conductor 3 is connected to the blade contact 60t and its associated flange on the lower end of the bus plate 60 and with the ground conductor 2 being connected to the middle bus plate 62. The switch contacts 18' of a modular switch unit mounted in the box 10 provide selective connection between the contacts 64c and 64c' in a manner as previously discussed. Consequently, when the switch contacts 18" are closed, power is provided to the octal box 86 from the conductor 1 of power cable 12 through bus plate 64, contacts 64c, switch contacts 18' of the modular switch unit 18, contact 64c', conductor 1 of the distribution cable 16 to the octal box 86, bus plate 110, contact 117, bayonet contact 131, the fixture 172, bayonet contact 133, spring contact 119, conductor 3, bus plate 60 and power input conductor 3. The grounded conductor 2 is connected to the bayonet contact 119 of the bus plate 112 in the octal box. Similarly, the multi-function box 10 is provided with a modular receptacle unit 14 which is connected to the power input conductors 1 and 2 by means of a second distribution cable 16' which would be inserted in the second cable opening in the bottom panel 22 of the multi-function box 10 so that the conductors 1' and 3' would be in electrical contact with the bus plate 64 and 60 respectively and the grounded contact 2' would be in contact with the bus plate 62.

FIGS. 13 through 19 illustrate components and circuitry usable in conjunction with three and four-way switching systems. A basic component of the system is a dual-purpose switch box 180 formed of plastic or other material including a top panel 182, a bottom panel 184 and side panels 186 and 188. Box 180 also includes a center divider wall 190 which divides the box into a bus plate compartment and function unit compartment with the bus plate compartment being to the right of the divider wall 190 as viewed in FIG. 13. The outer dimensions of the box are identical to those of box 10 and box 180 includes male and female connecting members identical to elements 28, 29, 30 and 31 provided along the corner edges of box 10. Similarly, the side panels 186 and 188 are provided with locking indentations 33 and a locking lug 32 identical to the same members employed in the side panels 19 and 20 of box 10.

Upper panel 182 is provided with a cable receiving well 192 dimensioned to receive the end of a four-conductor cable 194 with four conductor openings extending through the remaining portion of the top panel 182 so that the stripped conductors 1, 2, 3 and 4 of the cable 194 enter the bus plate compartment for respectively engaging blade and flange contacts 200', 201', 202', 203' of bus plates 200, 201, 202 and 203 of a stacked array of bus plates separated by layers of insulation material in the manner of the previously discussed bus plate array as used in box 10. However, it should be understood that the bus plates employed in the box 180 are positioned in four different planes and are of an entirely different shape and configuration from the previously discussed bus plates. In addition to the aforementioned bus plates, the assembly 199 also includes a lower front bus plate 206 that is co-planar with the bus plate 200 and a lower medial bus plate 208 that is co-planar with bus plate 202. Bus plate 200 includes a spring contact 210 and a co-planar bus plate 206 includes a spring contact 212 while bus plates 202 and 208 respectively include spring contacts 214 and 215 and a blade contact 216 extends forwardly of bus plate 203. Downwardly facing blade and flange contacts 206", 201" and 208" are respectively provided on the bus plates 206, 201 and 208 as best illustrated in FIG. 14. Blade contact 210 is positioned in a reinforced opening 230 which extends to the center divider wall 190 while contacts 216, 214, 215 and 212 respectively extend into reinforced passageways 232, 234, 236 and 238 wich similarly extend into the center divider wall 190.

The blade and flange contacts 206", 201", and 208" are respectively aligned with openings 239 in the bottom panel 184 through which the conductors of a three-wire distribution cable would extend with the opening closest to the center divider wall 190 in FIG. 13 being for receipt of the black conductor 1 and an appropriate designation BLK being provided on the lower surface of the panel 184 in the manner previously discussed. A similar designation is provided in the upper panel 182 adjacent the conductor 1 which is provided with black insulation in the conventional cable coding procedures.

Box 180 is provided for receiving a modular three-way switch unit 240 for use in conventional three-way systems or a modular alternate three-way switch unit 242 for use in conjunction with a four-way switch as part of a circuit in a manner to be discussed hereinafter. In any event, both of the modular switch units 240 and 242 are of the same size and shape as the previously discussed modular switch unit 18 and have their upper ends of a narrower width than their lower ends to be received in different width mating slots in the upper and lower panels 182 and 184 identical to the slots 22' and 24' provided in the upper and lower panels of the box 10 and which slots serve the same identical purpose as those in box 10. Also, the modular units 240 and 242 are provided with the rectangular lugs 54 etc. for locking the units in a desired position of insertion in the box so that the switch units will be flush with the wall in which the installation is being provided. The three-way modular switch unit 240 includes rearwardly extending elongated external terminals or contacts 240A, 240B and 240C which are respectively inserted in the reinforced openings 230, 232 and 234 in the divider wall 190 of box 180. Insertion of the modular switch unit 240 in the box 180 consequently results in the making of electrical contact with desired end plates with contact being specifically made between the elongated external terminals or contacts 240A and spring contact 210, between contact 240B and spring contact 216, and between contact 240C and spring contact 214. Similarly, the alternate three-way modular switch unit 242 includes elongated external terminals or contacts, 242E and 242D which are respectively inserted into the reinforced openings 230, 238 and 236 in the divider wall 190. Consequently, contact 242A makes electrical contact with the spring contact 210, contact 242E makes electrical contact with the spring contact 212 and contact 242D makes electrical contact with the spring contact 215 of the bus plate assembly.

FIG. 15 illustrates an octal box 250 for use in lighting or other circuits employing three-way switches or four-way switches which is of the same size and shape as the octal box 86 of FIG. 8 from which it differs only in the employment of a different bank of bus plates and different cable receiving openings in the side walls. More specifically, openings 252 are provided in wall 254 for connection to three-wire power cables and identical openings 255 are provided in wall 256 for enabling connection to additional three-wire power distribution cable 16 and openings 258 are provided in wall 260 for receiving four-wire cables connected to three-way switch members in a manner to be discussed.

A bank 262 of bus plates consisting of a sandwich type of individual bus plates separated by layers of insulation in the manner of the previously discussed bus plate banks is positioned in the octal box 250. The bus plates employed in octal box 250 includes first and second lowermost plates 264 and 266 positioned in a common plane but separated electrically by a spacing between the plates with bus plate 264 including knife blade and flange connections 268, 270 and 272 connectable to the conductors of cable members inserted in the octal box. Similarly, bus plate 266 includes knife blade and flange connector members 274, 276 and 277 and also includes a spring contact 266A which is inserted in a reinforced opening 278 in a divider wall 280 of the octal box 250 as shown in FIG. 15. A second bus plate 282 is positioned immediately above bus plates 264 and 266 and includes knife blade and flange contact portions 284, 286, 288, 290, 292 and 294 with a spring blade contact 286C extending downwardly through a reinforced opening 296 in the divider wall 280.

Coplanar bus plates 298 and 300 constitute the third plate means and are provided immediately above the bus plate 282 with bus plate 298 having first and second knife blade and flange contact components 302 and 304. It should be noted that the bus plates 298 and 300 are separated electrically by virtue of being spaced apart from each other in the same plane. Bus plate 300 includes knife blade and flange contacts 306, 308, 310 and 312 and also includes a spring blade contact 300B.

An uppermost bus plate 314 is provided above the bus plate 298 and includes knife blade and flange contact portions 316 and 318. A plug type connector identical to plug type connector 130 employed with the octal box of FIG. 8 is provided for connection to the octal box 250 with its elongated external terminals or contacts 131, 132 and 133 respectively extending upwardly through the reinforced openings 278, 313 and 296 for respective engagement with the spring blade contacts 266A, 300B and 286C.

FIG. 17 illustrates a four-way switch mounting box 320 for mounting a modular four-way switch unit 330 as part of a lighting or similar circuit. Box 320 is identical in size and shape to the previously discussed box members 10 and 180 but different in having two openings 331 in its upper horizontal panel 332 for receiving three-wire cable members connected to the three-way switch components. The upper panel 332 is also provided with the designation BLK to indicate the proper orientation of the cable members inserted in the openings 331. The box 320 is divided by a divider wall 336 in which reinforced openings 338, 340, 342 and 344 are provided. A bus plate assembly consisting of coplanar bus plates 348 and 350 positioned forwardly adjacent divider wall 336 is mounted in box 320 adjacent the divider wall 336. Bus plate 348 includes an upper knife blade and flange contact assembly 352 and a lower knife blade and flange connector assembly 354 and also includes a spring blade contact 348D which extends into the reinforced opening 340. Similarly, bus plate 350 includes an upper knife blade and flange contact 356 and a lower knife blade and flange contact 358 with a spring contact 350C extending forwardly through the opening 338 in the divider wall 336.

A small bus plate 362 is positioned adjacent the upper ends of bus plates 348 and 350 and includes knife blade and flange contact portions 364 and 366.

Co-planar bus plates 36B and 370 are positioned adjacent each other but are electrically isolated from each other due to the spacing 372 between these bus plates. Bus plate 368 includes a spring contact 368A and a flange and blade contact 374. Spring contact 368A extends forwardly into the opening 344 in the divider wall 336. Similarly, the bus plate 370 includes a blade and flange contact 376 and a forwardly extending spring contact 370B which extends into the reinforced opening 342 in the divider wall 336.

Four-way modular switch unit 330 includes rearwardly extending elongated external terminals or contacts 330A, 330B, 330C and 330D which respectively extend into the reinforced openings 344, 342, 338 and 340 of the divider wall 336. Consequently, contact 330A makes contact with the spring contact 368A, contact 330B makes electrical contact with the spring contact 370B, contact 330C makes electrical contact with the spring contact 350C and contact 330D makes electrical contact with the spring contact 348D. Modular four-way switch unit 330 can only be inserted in the box 320 when oriented in the manner illustrated in FIG. 17 due to the fact that the upper end of the modular switch unit is received in a relatively narrow slot in the top panel 332 of the box 320 while the lower end of the switch unit, which is wider than the upper end, is received in a wider slot in the bottom panel 321 of the box 320. The slots in the upper and lower panels of the box 320 are essentially identical to the slots 22' and 24' of the box 10 as previously discussed.

FIG. 19 illustrates the manner in which the octal box 250 is associated with first and second alternate three-way modular switch unit mounting boxes 180 and 180' and a four-way modular switch unit mounting box 320 for providing selective operation of light fixtures or the like having a plug-type connector 130 connected with bayonet contacts in the reinforced openings 278 and 313 and a grounded bayonet contact being extended upwardly through the reinforced opening 296 of the octal box. A three-wire power input cable 12 has its conductors inserted through one set of the openings 252 in wall 254 with the other opening being usable for further power distribution if desired. Bus plate 264 is connected to the power conductor 1 of the power cable through either of contacts 268 or 270 depending upon which set of openings 252 the power cable is inserted through. Bus plate 282 is connected to the ground conductor of the power cable 12 through either set of blade and flange contacts 284 or 286 and the spring blade contact 286C which is positioned in opening 296 is consequently connected to ground. The conductor 3 of the power cable 12 is connected to the bus plate 300 through blade and flange contacts 306 and 308 so that the spring contact 300B is consequently connected to the power conductor 3.

Conductor cables 194 and 194' each having four conductors designated 1 through 4 are inserted in the openings 258 (FIG. 15) in the octal box and have their opposite ends inserted in the openings 192 of one of the three-way switch mounting boxes 180 and 180'. Conductor 194 is inserted in the openings 258 on the right side as illustrated in FIG. 15. Conductors 2, 3 and 4 of the cables 194 and 194' are connected respectively to each other by virtue of having conductors 2 connected through blade and flange contacts 292 and 294 to bus plate 282, conductors 3 being connected to bus plate 298 through blade and flange contacts 302 and 304, conductors 4 being connected to bus plate 314 through blade and flange contacts 316 and 318. Conductor 1 of cable 194 is connected to blade and flange connector 277 of bus plate 266 while conductor 1 of cable 194' is connected to bus plate 264 by blade and flange contact 272.

Similarly, the alternate three-way switch units 242 mounted in boxes 180 and 180' have their contacts 242A engaging spring contact 210 of bus plate 200, contacts 242E engaging spring contact 212 of bus plate 206 and contacts 242D engaging spring contact 215 of bus plate 208 in the respective boxes. The inner workings of the switch actuator is in a first position, internal contact is made between the elongated external terminals or contacts 242A and 242D while positioning of the switch actuator in a second position causes internal contact to be made between contact 242D and contact 242E.

The contacts in the four-way switch member 330 are such that when the switch actuator is in one position, contact is provided between the bayonet contacts 330B and 330D while a circuit is simultaneously established between the contacts 330A and 330C by a second switch element. When the switch actuator is in its second position, a circuit is established between the contacts 330A and 330D by one of the internal switch members while a second circuit is simultaneously established between the contacts 330B and 330C by the other internal switch member. Connecting cables 16 and 16' have one end inserted in the opening 239 in boxes 180 and 180' for engagement of conductors 1, 2 and 3 respectively with bus plates 212, 201 and 208 with the opposite ends of these conductors being inserted in openings 331 in the top panel of four-way switch unit mounting box 320 in which the conductors 1 are respectively connected to bus plates 348 and 350, conductors 2 are connected to bus plate 362 and conductors 3 are connected to bus plates 368 and 370.

Therefore, it will be seen that actuation of either of the two special three-way switch members or the four-way switch member will complete a circuit to any fixture connected to the octal box if the circuit was not completed prior to actuation of the switch. Conversely, subsequent actuation of any one of the three switch members will deactivate the circuit to the fixture.

If only two three-way switches are desired to be used for controlling the fixture connected to the octal box 250, the four-way switch unit 330 and its mounting box 320 and connecting cables 16 and 16' are not used and the alternate three-way modular switch units 242 are also not used with three-way switch units 240 being substituted in their place.

When a three-way switch unit 240 is provided in the boxes 180 and 180', the contacts 240A engage spring contact 210 of bus plate 200, contacts 240B engage spring contact 216 of bus plate 203 and contact 240C engages contact 214 of bus plate 202. Each of the three-way switch members is conventional internally and includes a switching means which, when in a first position, provides a circuit between the bayonet contact 240A and 240B and when in a second position, provides a circuit between external terminal 240A and contact 240C. A conventional SCR dimmer unit having appropriate elongated external terminals or contacts could be used in place of the modular three-way switch units if desired.

FIG. 20 illustrates a modular receptacle unit mounting box 390 in which a three-way or single pole switch controlled modular receptacle unit 392 having elongated external terminals or contacts 392a, 392b, 392c and 392d is mounted with the respective contacts extending into reinforced openings 396, 397, 398 and 399 in a divider wall 400 in the box 390. A bank of bus plates 402 is positioned in the box 390 in the same manner as the bus plate assembly of the previously discussed mounting boxes 10 etc. Bus plate assembly 402 (FIG. 21) includes a forward bus plate 404 having blade and flange contacts 406 and 408 on its upper end and positioned in the reinforced opening 396 to contact with a forwardly extending spring contact 404A, the bayonet contact 392A of the modular unit receptacle 392. Additionally, the bus plate 404 includes a lower knife blade and flange contact 409. A second bus plate 414 has a forwardly extending spring contact 414D which extends into the reinforced opening 399 to contact the bayonet contact 392D of the modular receptacle unit 392 and also has knife blade and flange contacts 416 and 418 provided in its upper end and blade and flange contacts 420 and 422 provided in its lower end.

Co-planar bus plates 424 and 426 are positioned adjacent bus plate 414 with a tab connector 415 on bus plate 414 contacting bus plate 426. Bus plate 424 has a forwardly extending spring contact 424C and upper knife blade and flange contacts 428 and 430. A knife blade and flange contact 432 is provided on the lower end of the bus plate 424. Bus plate 426 is separated electrically from the bus plate 424 and includes a knife blade and flange contact 433 on its lower end. The rearmost bus plate 434 has a forwardly extending spring contact 434B which extends into the reinforced opening 397 to contact the external terminal 392B and also has knife blade and flange contacts 436 and 438 on its upper end and 439 on lower end.

FIG. 22 illustrates a circuit in which a pair of three-way switch members are provided for controlling a modular receptacle unit 392 mounted in a box 390 as illustrated in FIG. 20. As thus mounted, the contact 392C engages contact 424C of bus plate 424, contact 392B engages contact 434B of bus plate 434, contact 392A engages contact 404A of bus plate 404 and contact 392D engages contact 414D of bus plate 414. A three-wire power cable 12 is plugged into the bottom panel of the box 390 through openings 391 to establish contact with the bus plates 404, 414, and 424. Similarly, a four-wire cable 194L and 194R are connected to box 390 and to alternate three-way switch members 240R and 240L which can be a modular three-way switch unit such as unit 240 mounted in a box 180. Conductors 1 and 3 of the cable 194R are not utilized and are consequently not illustrated to their full extent. Similarly, the second four-wire cable 194L does not use its conductors 3 and 4 which are consequently not fully illustrated. Actuation of either of switches 240L or 240R, interconnected by power distribution cable 16", will provide switched control of current to receptacle unit 392 so that the current is terminated if previously on or initiated if previously off. Elimination of either switch 240L or 240R and either four (4) wire cable 194L or 194R respectively, along with power distribution cable 16" will convert the operation to single pole switch circuit.

While the present invention is directed to apparatus intended for more or less permanent installation, it is desirable to be able to disconnect the power and distribution cables from the mounting boxes 10, 180, 250 etc.; however, engagement of the sharp edge of the blade contacts such as 64t and 64t' illustrated in FIG. 5 with the conductors would normally prevent removal of the cable members. Consequently, cable release slots R are provided adjacent each of the cable receiving openings for permitting the insertion of the tines 500 on the end of a manually held tool 502 illustrated in FIG. 23. While the tool 502 of FIG. 23 employs only three tines 500 and is consequently for use with the three-conductor cables such as the power cables 12, it should be understood that another tool employing four tines would be used for releasing the four conductors of the four-conductor cable members. In any event, the tines are simply inserted in the slots R to engage the contact members and bend them away from the cable members can then be extracted from their specific mounting openings.

While numerous modifications of the subject invention will undoubtedly occur to those of skill in the art, it should be understood that the spirit and scope of the invention is to be limited solely by the appended claims.

We claim:

1. A multi-function box capable of being mounted in a wall for receiving electrical power from a power cable and distributing the power to a power distribution cable; a modular electric switch unit having first and second external terminals removably mounted in said multifunction box, said multi-function box including a distribution bus plate compartment and a function unit compartment in which said modular switch unit is mounted, a plurality of bus plates mounted in said bus plate compartment, automatic conductor retaining and clamping means on said bus plates, a plurality of power-input openings in said box dimensioned and positioned for receiving the stripped conductor ends of the conductors of a power cable and guiding said conductors into contact with said automatic conductor retaining and clamping means on respective ones of said bus plates as the conductor ends of a power cable are inserted through said power-input openings, each of said automatic conductor retaining and clamping means including automatically operable means permitting ready insertion of a conductor end but resisting any withdrawal of said conductor end, power distribution output openings in said box dimensioned and positioned for receiving the stripped ends of the conductors of a power distribution cable and guiding said stripped conductor ends of said power distribution cable in contact with other automatic conductor receiving and clamping means on selected ones of said bus plates, and means for providing a selectively operable electrical flow path through said modular switch unit to said power distribution cable, said last-mentioned means comprising a first bus plate having a contact element engaging said first terminal of said modular electric switch unit, a second bus plate having a contact element engaging said second external terminal, said first bus plate having automatic conductor retaining and clamping means engageable with one conductor of a power cable, said second bus plate having an automatic conductor retaining and clamping means engageable with one conductor of a distribution cable and a third bus plate having automatic conductor retaining and clamping means engageable with a second conductor of a power cable and a second conductor of a distribution cable.

2. The invention of claim 1 wherein said multi-function box includes first and second spaced parallel side panels, parallel top and bottom panels and a divider wall extending between said first and second side panels and said top and bottom panels between said bus plate compartment and said function unit compartment, said divider wall including a plurality of openings positioned in alignment with the external terminals of said modular electric switch unit to permit said external terminals to pass through said divider wall and engage contacts of selected bus plates in said bus plate compartment.

3. The invention of claim 2 wherein said multi-function box is formed of plastic material, said bus plates comprise generally planar metal plates and additionally including insulation members sandwiched between adjacent ones of said metal plates and means bonding said metal plates and insulation members into a unitary ensemble.

4. The invention of claim 3 wherein the contact elements of said bus plates comprise spring contact members extending outwardly from said bus plate members.

5. The invention of claim 3 wherein said multi-function box includes guide means in which said modular electric switch unit is positioned for sliding movement and retaining means for locking said modular electric switch unit in any desired adjusted position in said guide means to permit flush wall mounting of said modular electric switch unit.

6. The invention of claim 5 wherein said guide means comprises an upper downwardly facing guide slot in said top panel and a lower upwardly facing guide slot in said bottom panel of a width different from the width of said downwardly facing slot, and wherein the upper and lower ends of said modular electric switch unit are dimensioned to respectively snugly be received in said upper and lower slots so that said electric switch unit can only be received in said box in one manner of orientation.

7. The invention of claim 6 wherein said retaining means includes expandable means in each of said slots operable to be forcefully expanded against said slots and external actuator means on the front of the modular electric switch unit is in a desired position of adjustment.

8. The invention of claim 7 wherein said expandable means includes upper and lower bifurcated lock plates on said modular electric switch unit respectively received in said upper and lower guide slots, each of said bifurcated lock plates including a pair of fingers, wherein said actuator means includes first and second rotary members each respectively associated with one of said bifurcated lock plates, a lug means on one end of each of said rotary members positioned between the fingers of its associated lock plate to expand said fingers outwardly in opposite directions into forceful engagement with the guide slot in which the fingers are positioned upon rotation of said rotary members.

9. The invention of claim 8 wherein the external terminals of said modular switch unit comprise elongated contacts and the contact elements of said bus plates engaged by the elongated contacts of the modular switch unit comprise spring contact members extending outwardly from said bus plate members.

10. The invention of claim 9 wherein each of said automatic conductor retaining and clamping means includes a cantilever spring blade having a sharp outer end edge and a fixed surface between which fixed surface and said sharp outer end edge a conductor insertion space is defined for receiving the stripped end of a conductor of a power cable so that when a conductor is so inserted said sharp outer end edge is biased into the side surface of the conductor and wherein said sharp outer end edge is oriented so that said sharp edge is urged into the conductor by any outward movement of the conductor to resist such outward movement.

11. The invention of claim 2 wherein each of said automatic conductor retaining and clamping means includes a cantilever spring blade having a sharp outer end edge and a fixed surface between which fixed surface and said sharp edge a conductor insertion space is defined for receiving the stripped end of a conductor of a cable so that when a conductor is so inserted said sharp outer end edge is biased into the side surface of the conductor and wherein said sharp edge is oriented so that said sharp edge is urged into the conductor by any outward movement of the conductor to resist such outward movement.

12. The invention of claim 11 wherein said multifunction box includes first and second spaced parallel side panels, parallel top and bottom panels and a divider wall extending between said first and second side panels and said top and bottom panels between said bus plate compartment and said function unit compartment, said divider wall including a plurality of openings positioned so that said external terminals extend through said openings to engage contact elements of said first and second bus plates in said bus plate compartment.

13. The invention of claim 12 wherein said multifunction box is formed of plastic material, said bus plates comprise generally planar metal plates and additionally including insulation members sandwiched between adjacent ones of said metal plates and means bonding said metal plates and insulation members into a unitary ensemble.

14. The invention of claim 13 wherein there are three bus plate members respectively oriented in spaced parallel planes.

15. The invention of claim 1 additionally including designator means adjacent said power input and power output openings for indicating the proper position of insertion of said power cable and said power distribution cable to provide positioning correlation of individual cable conductors of said power cable and said power distribution cable with other system components.

16. The invention of claim 15 wherein said multifunction box includes guide means in which said modular electric switch unit is inserted for sliding movement and retaining means for locking said modular electric switch unit in a desired adjusted position in said guide means to permit flush wall mounting of said modular electric switch unit.

17. The invention of claim 16 wherein said guide means comprises an upper downwardly facing guide slot in said top panel and a lower upwardly facing guide slot in said bottom panel of a width different from the width of said downwardly facing slot, and wherein the upper and lower ends of said modular electric switch unit are dimensioned to respectively snugly be received in said upper and lower slots so that said modular electric switch unit can only be received in said box in one manner of orientation.

18. The invention of claim 17 wherein said retaining means includes expandable means in each of said slots operable to be forcefully expanded against said slots and external actuator means on the front of the modular electric switch unit for actuating said expandable means when the modular electric switch unit is in a desired position of adjustment.

19. A power distribution box for an electric power distribution system, said box comprising modular unit mounting means in said power distribution box for removably receiving a modular electric unit in only one position of orientation relative to the box, a modular electric unit mounted in said modular unit mounting means, a power cable receiving opening in one wall of said power distribution box including individual conductor guide openings for guiding the bare conductor ends of a multiconductor power cable upon insertion of said bare conductor ends through said guide openings into the interior of said power distribution box, a distribution cable receiving opening in one wall of said box including individual conductor guide openings for guiding the bare conductor ends of a multi-conductor distribution cable upon insertion of said latter bare conductor ends through the last-mentioned openings into the interior of said box, designator means adjacent each of said cable receiving openings for indicating the proper position of insertion of each of said cables to provide positioning correlation of individual conductors of said multi-conductor cables with other system components, and circuit establishing means on the interior of said power distribution box for automatically establishing a conductive circuit from a power cable to a distribution cable and to said modular electric unit mounted in said box in response to the proper insertion of said cables thru said cable receiving openings.

20. The invention of claim 19 wherein said modular electric unit includes external contact means and said circuit establishing means includes a bus plate ensemble including automatic cable conductor contact and retaining means positioned to be engaged by the bare conductor ends of said cable conductors when said conductor ends are inserted in said box and also includes spring contact members engageable with said external contact means of said modular electric unit when such a unit is positioned in said modular unit mounting means.

21. The invention of claim 20 wherein said automatic cable conductor contact and retaining means comprises a plurality of cantilever spring blades each having a sharp outer end edge and an adjacent fixed flange and between each flange and sharp outer end edge a cable conductor receiving space is defined, each of said cantilever spring blades being canted so that when a conductor having bare conductor ends is inserted in a conductor receiving space said cantilever spring blade engages the sides of said bare conductor end so that outward movement of such conductor tends to urge the sharp outer edge of said blade into the bare conductor end to resist extraction of said conductor end from the box.

22. The invention of claim 20 wherein said external contact means comprises a plurality of elongated contacts, said power distribution box includes first and second spaced parallel side panels, parallel top and bottom panels and a divider wall extending between said first and second side panels and said top and bottom panels to separate each box into a bus plate ensemble compartment and a function unit compartment, said divider wall including a plurality of openings through which said elongated contacts of said modular electric unit extend so that said elongated contacts engage the spring contact members of the bus plate ensemble.

23. The invention of claim 22 wherein said box is formed of plastic material, said bus plate ensemble comprises metal plates and insulation members sandwiched between adjacent ones of said metal plates and means bonding said metal plates and insulation members into a unitary assembly.

24. The invention of claim 23 wherein the modular unit mounting means includes guide means for sliding insertion of a modular electric unit, and retaining means for locking said modular electric unit in any desired position in said guide means to permit flush wall mounting of said modular electric unit.

25. The invention of claim 24 wherein said guide means comprises an upper downwardly facing guide slot in said top panel and a lower upwardly facing guide slot in said bottom panel, said lower slot being a width different from the width of said downwardly facing slot, and wherein the upper and lower ends of said modular unit means are dimensioned to be respectively snugly received in said upper and lower slots so that a modular electric unit can only be received in said box in one manner of relative orientation to said box.

26. The invention of claim 25 wherein said retaining means includes expandable means in each of said slots operable to be forcefully expanded against said slots and external actuator means on the front of the modular electric unit for actuating said expandable means when the modular electric unit is in a desired position of adjustment.

27. The invention of claim 19 wherein said circuit establishing means includes automatic cable conductor contact and retaining means associated with the conductor receiving spaces having a plurality of cantilever spring blades each having a sharp outer end edge and an adjacent fixed flange and between each flange and sharp outer end edge a cable conductor receiving space is defined, each of said cantilever spring blades being canted so that when a bare conductor end is inserted in the associated conductor receiving space said cantilever spring blade engages the side of said bare conductor end so that outward movement of said conductor tends to urge the sharp outer end edge of said blade into the bare conductor end to resist extraction of said conductor from the box.

28. The invention of claim 27 wherein said circuit establishing means includes a bus plate ensemble consisting of a sandwich array of bus plates and interleaved insulation material, said bus plates including said automatic cable conductor contact and retaining means positioned to receive and hold the bare conductor ends of power cable and distribution cable conductors when said conductors are inserted in said box and also including spring contact members positioned to be engaged by contact means on said modular electric unit for establishing an operative circuit to said modular electric unit.

29. The invention of claim 19 in which said power distribution box has a third cable receiving opening in a wall of the box for a second distribution cable and including individual guide openings for guiding the bare conductor ends of a multi-conductor power distribution cable upon insertion of said bare conductor ends through the guide openings of said third cable receiving opening into the interior of the power distribution box, designator means adjacent said third cable receiving opening for indicating the proper manner of insertion of a distribution cable in said third cable receiving opening, one of said second and third cable receiving openings being for use when a modular electric switch unit is mounted on the modular unit mounting means of the box and the other of said second and third openings being for providing a circuit continuation of a power cable to a distribution cable when such power cable is inserted in the first mentioned cable receiving opening and said distribution cable is inserted in said other cable receiving opening.

30. The invention of claim 19 wherein said modular electric unit comprises a modular switch unit means for providing a switched circuit connection from a power cable mounted in said power cable receiving opening through said circuit establishing means to a distribution cable mounted in said distribution cable receiving opening.

31. The invention of claim 30 wherein said modular switch unit includes external contact means and said circuit establishing means includes a bus plate ensemble including automatic cable conductor contact and retaining means positioned to be engaged by the bare conductor ends of said cable conductors when said bare conductor ends are inserted in said box and also includes spring contact members engageable with said external contact means of said modular electric unit when said modular switch unit is positioned in said modular unit mounting means.

32. The invention of claim 31 wherein said automatic cable conductor contact and retaining means each comprises a cantilever spring blade each having a sharp outer end edge and an adjacent fixed flange with a conductor receiving space being defined between each flange and sharp outer end edge, each of said cantilever spring blades being canted so that when a conductor having bare conductor ends is inserted in a conductor receiving space said cantilever spring blade engages the sides of said bare conductor end so that any subsequent outward movement of such conductor tends to urge the sharp outer edge of said blade into the bare conductor to resist extraction of said conductor end from the box.

33. The invention of claim 19 wherein said modular electric unit comprises a modular receptacle unit having external contacts and said circuit establishing means includes a bus plate ensemble including a first group of automatic cable conductor contact and retaining means positioned to be engaged by the bare conductor ends of a power cable positioned in said power cable receiving opening, a second group of automatic cable conductor contact and retaining means positioned to be engaged by the bare conductor ends of a distribution cable positioned in the distribution cable receiving opening and spring contacts engaged by the external contacts of said modular receptacle unit for providing a circuit from said first group of contacts to said second group of contacts and said modular receptacle unit.

34. The invention of claim 33 wherein said automatic cable conductor contact and retaining means each comprises a cantilever spring blade each having a sharp outer end edge and an adjacent fixed flange with a conductor receiving space being defined between each flange and sharp outer end edge, each of said cantilever spring blades being canted so that when a conductor having bare conductor ends is inserted in a conductor receiving space said cantilever spring blade engages the sides of said bare conductor end so that any subsequent outward movement of such conductor tends to urge the sharp outer edge of said blade into the bare conductor to resist extraction of said conductor end from the box.

35. An octal box means, a first cable receiving opening in a wall of said octal box including individual conductor guide openings for guiding the bare conductor ends of a multi-conductor distribution cable upon insertion of such bare conductor ends through said conductor guide openings into the interior of the octal box means, designator means adjacent said cable receiving opening in said octal box for indicating the proper position of insertion of such a distribution cable to provide positioning correlation of individual cable conductors of said distribution cable with other system components, a sandwich array of octal box bus plates on the interior of said octal box, said octal box bus plates including distribution cable conductor contact and retaining means consisting of a plurality of cantilever spring blades each having a sharp outer end edge and an adjacent fixed flange and between which flange and sharp outer end edge a cable conductor receiving space is defined, each of said cantilever spring blades being canted at an angle so that when a conductor is inserted into the adjacent conductor receiving space, said cantilever spring blade engages the side of said conductor so that outward movement of a conductor tends to urge said edge into the conductor to resist extraction of said conductor from the octal box, said octal box bus plates additionally including spring contact members for electric contact with a plug-type connector having a plurality of external contacts inserted into said octal box for engagement with the spring contacts of said octal box bus plates and a second power distribution cable receiving opening provided in said octal box for enabling the insertion of bare conductor ends of a further power distribution cable into the interior of said octal box, said octal box bus plates including further cantilever spring blades and associated fixed flange portions adjacent said second power distribution cable receiving opening for receiving and holding the bare conductor ends of a further power distribution cable upon the insertion thereof in said second power distribution cable receiving opening to provide en electrical circuit between power distribution cables inserted in said first and second cable receiving openings.

36. An electrical circuit component comprising a multi-function box, modular function unit means, guide means in said box in which modular function unit means is positioned for sliding movement to a desired position in said box and retaining means for locking said modular function unit means in any desired position in said guide means to permit flush mounting of said modular function unit means with a wall in which the box is mounted, said guide means comprising first and second inwardly facing guide slots provided in opposite sides of said multi-function box, each of said inwardly facing guide slots having first and second opposed side walls, wherein said retaining means includes first and second expandable members respectively positioned in said first and second inwardly facing guide slots and being operable to be forcefully expanded against the side walls of their associated slot and external actuator means on the front of the modular function unit means for actuating said expandable members when the modular function unit means is in a desired position of adjustment.

37. The invention of claim 36 wherein said expandable means comprises first and second bifurcated lock plates on said modular function unit means respectively received in said first and second inwardly facing guide slots, each of said bifurcated lock plates including a pair of fingers and wherein said actuator means includes first and second rotary members respectively associated with each of said bifurcated lock plates, lug means on one end of each of said rotary members positioned between the fingers on its associated lock plate to expand said fingers outwardly into forceful engagement with the side walls of its associated guide slot upon rotation of said rotary member.

38. The invention of claim 37 wherein said modular function unit means comprises modular switch means, external contacts on said modular switch means and further including spring contact means in said multi-function box engaging said external contacts for all positions of adjustment of said modular switch means.

39. The invention of claim 37 wherein said modular function unit comprises electrical receptacle means, external contacts on said electrical receptacle means and spring contact means in said multi-function box engaging said external contacts for all positions of adjustment of said receptacle means.

40. A multi-function electric box for use with an electric receptacle and octal box unit or with an electric switch unit having external contacts, said box including:
(a) A plurality of electric conductor elements supported in said box so as to be electrically insulated from each other,
(b) a plurality of resilient electric contact elements on said conductor elements including a first group of said contact elements disposed for electric contact with the external contacts of a compatible electric switch unit when such a switch unit is mounted on the box,
(c) first opening means in a wall of the box for insertion of the stripped conductor ends of a first electric power cable with said opening means being so positioned that upon such insertion said stripped conductor ends make electric contact with a group of said electric conductor elements, (d) second opening means in a wall of the box for insertion of the stripped conductor ends of the conductors of a second electric power cable with said second opening means being so positioned that upon insertion of said stripped conductor ends of said second electric power cable make electric contact with the same group of electric conductor elements as are contacted by the stripped conductor ends of the first power cable, (e) third opening means in a wall of the box for insertion of the stripped conductor ends of the conductors of a third electric power cable with said third opening means being so positioned that upon such insertion the stripped ends of the conductors of said third power cable make electric contact with the same group of electric conductor elements as are contacted by the contacts of said second power cable, and (f) fourth opening means in a wall of the box for receiving the stripped ends of the conductors of a power distribution cable of a distribution circuit with said fourth opening means being so positioned that upon such insertion said stripped ends of the conductors of said power distribution cable make electric contact with a different group of said electric conductor elements than are contacted by the power cables so that upon mounting a compatible switch unit on the box said switch unit would provide control of the distribution circuit of said power distribution cable.

41. A multi-function electric box for use with an electric receptacle unit having three external terminals, said box including:

(a) a plurality of electric conductor elements supported in said box so as to be electrically insulated from each other, (b) a plurality of resilient electric contact elements on said conductor elements including a first group of said contact elements being disposed for electric contact with the terminals of a compatible electric receptacle unit when such a unit is mounted on the box, (c) first opening means in a wall of the box for insertion of the stuffed stripped conductor ends of electric power cable with said opening means being so positioned that upon such insertion said stuffed stripped conductor ends make electric contact with a group of said electric conductor elements, (d) second opening means in a wall of the box for receiving the stuffed stripped ends of the conductors of a first power distribution cable with said second opening means being so positioned that upon such insertion said stuffed stripped ends of said first power distribution cable make electric contact with a different group of said electric conductor elements than are contacted by the power cable, (e) third opening means in a wall of the box for insertion of the stuffed stripped ends of the conductors of a second power distribution cable with said third opening means being so positioned that upon such insertion said stuffed stripped conductor ends of said second power distribution cable make electric contact with the same group of electric conductor elements as are contacted by the first power distribution cable, and (f) fourth opening means in a wall of the box for receiving the stuffed stripped ends of the conductors of a third power distribution cable with said fourth opening means being so positioned that upon such insertion said stuffed stripped ends of the conductors of said third power distribution cable make electric contact with a different group of said electric conductor elements than are contacted by the electric power cable or the first and second power distribution cables such than upon mounting a compatible receptacle unit on the box said receptacle unit would be controlled by the circuit of said first, second or third power distribution cables.

42. A multi-function electric octal box for use with an electric ficture having external terminals or as a 4-way junction box unit, said box including:

(a) a plurality of electric conductor elements supported in said octal box so as to be electrically insulated from each other and each including means for automatic locking connection to an electrical conductor of a power cable to preclude withdrawal of the cable (b) a plurality of resilient electric contact elements on said conductor elements including a first group of said contact elements disposed for electric contact with external terminals of a compatible electric fixture unit when such unit is mounted on the box, (c) first opening means in a wall of the octal box for insertion of the stuffed stripped conductor ends of electric power cable with said opening means being so positioned that upon such insertion said stuffed stripped conductor ends automatically make electric contact with a group of said electric conductor elements, (d) second opening means in a wall of the octal box for insertion of the stuffed stripped conductor ends of a first power distribution cable with said second opening means being so positioned that upon such insertion said stuffed stripped conductor ends of said first power distribution cable automatically make electric contact with the same group of electric conductor elements as are contacted by the first mentioned electric power cable, (e) third opening means in a wall of the octal box for insertion of the stuffed stripped conductor ends of a second power distribution cable with said third opening means being so positioned that upon such insertion said stuffed stripped conductor ends of said second power distribution cable automatically make electric contact with the same group of electric conductor elements as are contacted by the first electric power and first power distribution cables, and (f) fourth opening means in a wall of the octal box for insertion of the stuffed stripped conductor ends of a third power distribution cable with said fourth opening means being so positioned that upon such insertion said stuffed stripped conductor ends of said third power distribution cable automatically make electric contact with the same group of electric conductor elements as are contacted by the first electric power cable and the first, second and third power distribution cables.

43. A multi-function electric octal box for use with an electric fixture unit having external terminals, said box including:

(a) a plurality of electric conductor elements supported in said box so as to be electrically insulated from each other, (b) a plurality of resilient electric contact elements on said conductor elements including one group of said contact elements being disposed for electric contact with the terminals of a compatible electric fixture unit when such a unit is mounted on the box, (c) first opening means in a wall of the octal box for insertion of the stuffed stripped conductor ends of a first electric power cable with said opening means being so positioned at upon such insertion said stuffed stripped conductor ends of said first electric power cable make electric contact with a group of said electric conductor elements, (d) second opening means in a wall of the octal box for insertion of the stuffed stripped conductor ends of a first power distribution cable with said second opening means being so positioned that upon such insertion said stuffed stripped conductor ends of said first power distribution cable make electric contact with the same group of electric conductor elements as are contacted by the first electric power cable, (e) third opening means in a wall of the octal box for receiving the stuffed stripped conductor ends of a second power distribution cable with said third opening means being so positioned that upon such insertion said stuffed stripped conductor ends of said second power distribution cable make electric contact with a different group of said electric conductor elements than are contacted by the first electric power cable such that upon mounting a compatible fixture unit on the box said fixture unit would be controlled by the circuit on the fourth and fifth power distribution cables described subsequently in (g) and (h), (f) fourth opening means in a wall of the octal box for receiving the stuffed stripped conductor ends of a third power distribution cable with said fourth opening means being so positioned that upon such insertion said stuffed stripped conductor ends of said third power distribution cable make electric contact with the same group of electric conductor elements as are contacted by the second power distribution cable, (g) fifth opening means in a wall of the octal box for receiving the stuffed stripped conductor ends of a fourth power distribution cable with said fifth opening means being so positioned that upon such insertion said stuffed stripped conductor ends of said fourth power distribution cable make electric contact with a different group of said electric conductor elements than are contacted by the electric power cable and the first, second and third power distribution cables such that upon mounting a compatible fixture unit on the octal box said octal box unit would be controlled by the said fourth power distribution cable from a 3-way switch, and (h) sixth opening means in a wall of the octal box for receiving the stuffed stripped conductor ends of a fifth power distribution cable with said sixth opening means being so positioned that upon insertion said stuffed stripped conductor ends of said fifth power distribution cable make electric contact with a different group of said electric conductor elements than are contacted by the electric power cable and the first, second, third, and fourth power distribution cables such that upon mounting a compatible fixture unit on the octal box said octal box unit would be controlled by the said power distribution cable from a second 3-way switch.

44. A multi-function box for use with an electric 3-way switch unit, said box including:
(a) a plurality of electric conductor elements supported in said box so as to be electrically insulated from each other and each including means for automatic locking connection to an electrical conductor of a power cable to preclude withdrawal of the cable,
(b) a 3-way switch unit having three external terminals removably mounted in said box,
(c) a plurality of resilient electric contact elements on said conductor elements including a first group of said contact elements disposed for electric contact with the three external terminals of said electric 3-way switch unit in response to the mounting of such a switch unit on the box,
(d) first opening means in a wall of the box for insertion of the stripped ends of the conductors of a first power distribution cable with said opening means being so positioned that upon insertion said stripped ends of said conductors of said first power distribution cable automatically make electric contact with a second group of said electric contact elements in response to said insertion, and
(e) second opening means in a wall of the box for receiving the stripped ends of a second power distribution cable of a distribution circuit with said second opening means being so positioned that upon such insertion said stripped ends of the conductors of said second power distribution cable automatically make electric contact with a third group of electric contact elements in response to said insertion of the stripped ends of the second power distribution cable to provide a circuit effecting switch control for the circuit of said second power distribution cable by said 3-way switch unit.

45. A multi-function electric box for use with an electric 4-way switch unit having four external terminals, said box including:
(a) a plurality of electric conductor elements supported in said box so as to be electrically insulated from each other and each including means for automatic locking connection to an electrical conductor of a power cable to preclude withdrawal of the power cable,
(b) a 4-way switch unit having four external terminals mounted in said box,
(c) a plurality of resilient electric contact elements on said conductor elements with one group of said contact elements being disposed in electric contact with external terminals of said 4-way switch unit mounted in said box,
(d) first opening means in a wall of the box for insertion of the stripped ends of the conductors of a first power distribution cable with said opening means being so positioned that upon such insertion said stripped ends of the conductors of said first power distribution cable automatically make electric contact with a second group of said contact elements, and
(e) second opening means in a wall of the box for receiving the stripped ends of a second power distribution cable of a distribution circuit with said second opening means being so positioned that upon such insertion said stripped ends of the conductors of said second power distribution cable automatically make electric contact with a third group of said electric contacts for effecting a circuit providing switch control of the distribution circuit of said second power distri0 bution cable by means of said 4-way switch unit.

* * * * *